(12) United States Patent
Oara

(10) Patent No.: US 11,307,828 B2
(45) Date of Patent: *Apr. 19, 2022

(54) SYSTEM AND METHOD FOR CREATING A PROCESS FLOW DIAGRAM WHICH INCORPORATES KNOWLEDGE OF BUSINESS RULES

(71) Applicant: Hatha Systems, LLC, Washington, DC (US)

(72) Inventor: Ioan Mihai Oara, Raleigh, NC (US)

(73) Assignee: HATHA SYSTEMS, LLC, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/168,854

(22) Filed: Feb. 5, 2021

(65) Prior Publication Data

US 2021/0240449 A1 Aug. 5, 2021

Related U.S. Application Data

(63) Continuation-in-part of application No. 17/013,130, filed on Sep. 4, 2020.

(60) Provisional application No. 62/970,368, filed on Feb. 5, 2020, provisional application No. 62/970,556, filed on Feb. 5, 2020, provisional application No. 62/970,466, filed on Feb. 5, 2020.

(51) Int. Cl.
| | |
|---|---|
| *G06F 8/20* | (2018.01) |
| *G06F 8/41* | (2018.01) |
| *G06F 16/25* | (2019.01) |
| *G06Q 10/10* | (2012.01) |

(52) U.S. Cl.
CPC ............ *G06F 8/22* (2013.01); *G06F 8/433* (2013.01); *G06F 16/254* (2019.01); *G06Q 10/103* (2013.01)

(58) Field of Classification Search
CPC .......... G06F 8/22; G06F 8/433; G06F 16/254
USPC ................................................. 717/104–120
See application file for complete search history.

(56) References Cited

U.S. PATENT DOCUMENTS

| | | | |
|---|---|---|---|
| 6,038,538 A | 3/2000 | Agrawal et al. | |
| 6,278,977 B1 | 8/2001 | Agrawal et al. | |
| 6,308,224 B1 | 10/2001 | Leymann et al. | |
| 6,910,204 B1 * | 6/2005 | Rossomando | G06F 8/10 717/122 |

(Continued)

OTHER PUBLICATIONS

Eijndhoven et al, "Achieving business process flexibility with business rules", IEEE, pp. 95-104 (Year: 2008).*

(Continued)

*Primary Examiner* — Anil Khatri
(74) *Attorney, Agent, or Firm* — Nelson Mullins Riley & Scarborough LLP; Anthony A. Laurentano

(57) ABSTRACT

A system and method for associating a technical artifact and one or more business rules with one or more portions of a process flow diagram by extracting a plurality of technical artifacts from a computing system having a plurality of software applications, providing a process flow diagram having a plurality of nodes and a plurality of edges, associating one or more of the plurality of technical artifacts with one or more of the plurality of nodes of the process flow diagram, displaying the process flow diagram, and when the node is actuated, displaying the associated technical artifact.

32 Claims, 18 Drawing Sheets

(56) References Cited

U.S. PATENT DOCUMENTS

| | | | | |
|---|---|---|---|---|
| 7,003,766 | B1* | 2/2006 | Hong | G06F 9/4488 |
| | | | | 717/162 |
| 7,331,037 | B2* | 2/2008 | Dickey | G06F 9/451 |
| | | | | 717/109 |
| 7,404,177 | B1* | 7/2008 | Greenfield | G06F 9/541 |
| | | | | 717/106 |
| 7,448,022 | B1* | 11/2008 | Ram | G06F 9/45504 |
| | | | | 717/120 |
| 7,631,006 | B2 | 12/2009 | Hagstrom et al. | |
| 7,702,605 | B2* | 4/2010 | Friedlander | G06Q 10/10 |
| | | | | 706/45 |
| 7,712,073 | B1 | 5/2010 | Srinivasan et al. | |
| 8,065,658 | B1 | 11/2011 | Bali et al. | |
| 8,234,621 | B2* | 7/2012 | Killisperger | G06Q 10/10 |
| | | | | 715/228 |
| 8,719,773 | B2* | 5/2014 | Slone | G06F 8/33 |
| | | | | 717/109 |
| 8,904,342 | B2* | 12/2014 | Bauder | G06F 8/20 |
| | | | | 717/136 |
| 9,189,203 | B1* | 11/2015 | Hadar | G06F 8/10 |
| 9,576,017 | B2 | 2/2017 | Kummer et al. | |
| 10,379,826 | B1 | 8/2019 | Klinger et al. | |
| 10,635,566 | B1* | 4/2020 | Talluri | G06F 9/4488 |
| 11,244,364 | B2* | 2/2022 | Yu | G06Q 30/0283 |
| 2003/0171947 | A1 | 9/2003 | Ledford et al. | |
| 2004/0088197 | A1 | 5/2004 | Childress et al. | |
| 2004/0088678 | A1 | 5/2004 | Litoiu et al. | |
| 2009/0241088 | A1 | 9/2009 | Dangeville et al. | |
| 2012/0159427 | A1 | 6/2012 | Oara et al. | |
| 2012/0272205 | A1 | 10/2012 | Fox et al. | |
| 2013/0047090 | A1 | 2/2013 | Bhandarkar et al. | |
| 2013/0054627 | A1 | 2/2013 | Rausch et al. | |
| 2014/0282199 | A1 | 9/2014 | Basu et al. | |
| 2015/0012329 | A1 | 1/2015 | Prakash et al. | |
| 2015/0248203 | A1 | 9/2015 | Srivastava et al. | |
| 2015/0268955 | A1 | 9/2015 | Mehalingam et al. | |
| 2015/0363197 | A1 | 12/2015 | Carback, III et al. | |
| 2015/0363294 | A1 | 12/2015 | Carback, III et al. | |
| 2016/0313979 | A1 | 10/2016 | Hadar et al. | |
| 2021/0240454 | A1 | 8/2021 | Oara | |
| 2021/0241191 | A1 | 8/2021 | Oara | |

OTHER PUBLICATIONS

Mitra et al, "Analyzing Business Systems comprised of Rules and Processes using Decision Diagrams", ACM, pp. 1-5 (Year: 2020).*

Chourey et al, "Functional Flow Diagram(FFD): Semantics for Evolving Software", IEEE, pp. 2193-2199 (Year: 2016).*

Chomngern et al, Mobile Software Model for Web-Based Learning Using Information Flow Diagram (IFD), ACM, pp. 243-247 (Year: 2017).*

Heer et al., "Software Design Patterns for Information Visualization", IEEE, pp. 853-860 (Year: 2006).*

Chourey et al, "Functional Flow Diagram(FFD): Semantics for Evolving Software", IEEE, pp. 2193-2199 (2016).

Meng et al, "Transformation from Data Flow Diagram to UML2.0 Activity Diagram", IEEE, pp. 1010-1014 (2010).

Guo, "Automatic Transformation from Data Flow Diagram to Structure Chart", ACM, 44-49 (1997).

Erol et al. "Combining BPM and social software: contradiction or chance?" Journal of software maintenance and evolution: research and practice 22.6-7 (2010): 449-476. Apr. 29, 2010 (Apr. 29, 2010) Retrieved on Mar. 27, 2021 (Mar. 27, 2021) from <https://onlinelibrary.wiley.com/doi/abs/10.1002/smr.460>.

International Search Report and Written Opinion, PCT/US2021/016795, dated May 4, 2021, 13 pages.

International Search Report and Written Opinion, PCT/US2021/016796, dated Apr. 23, 2021, 11 pages.

International Search Report and Written Opinion, PCT/US2021/016799, dated Apr. 15, 2021, 15 pages.

Leon. "The future of computer-aided innovation." Computers in Industry 60.8 (2009): 539-550. Jun. 27, 2009 (Jun. 27, 2009) Retrieved on Mar. 28, 2021 (Mar. 28, 2021) from <https://www.sciencedirect.com/science/article/abs/Pii/S0166361509001286> entire document.

* cited by examiner

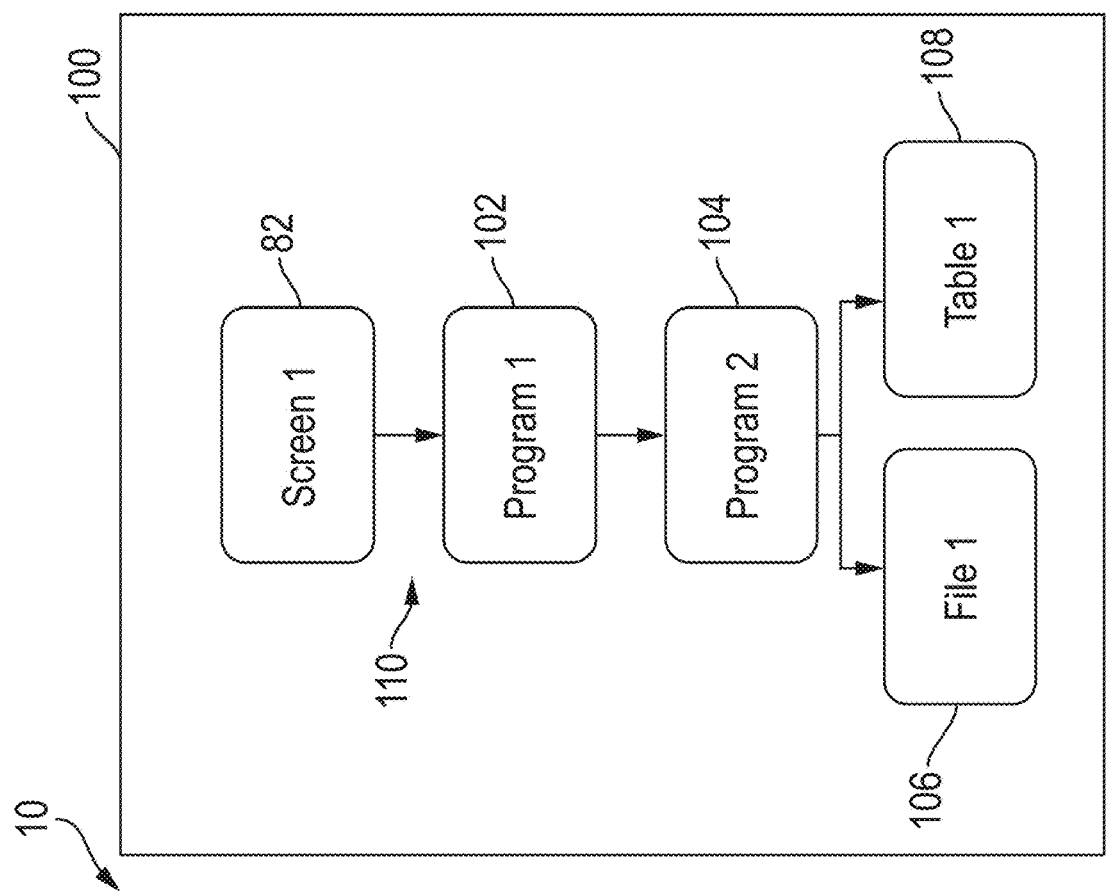
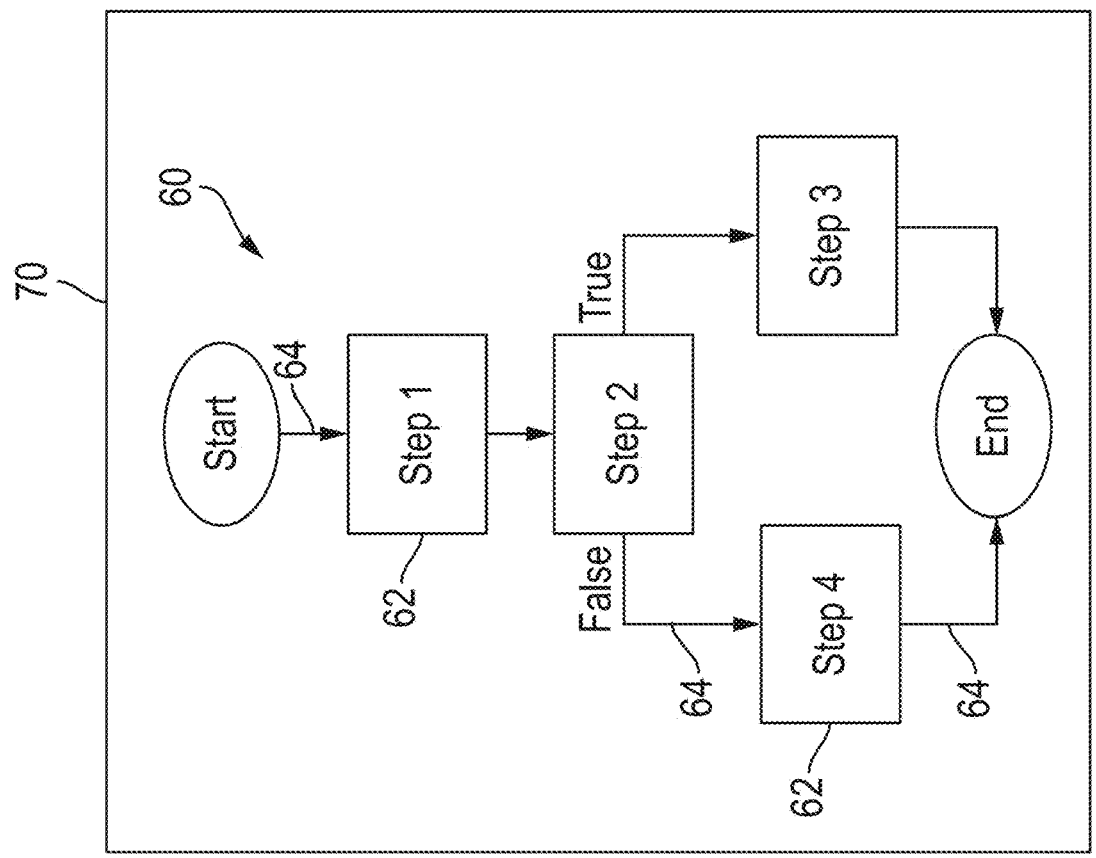
FIG. 5

| Process Node | Deletes | Reads | Writes |
|---|---|---|---|
| (Check Facts)INQMAP3 | | (LogicalFile)CUSTMAS<br>(LogicalFile)INVPATH | |
| (Create Order)Create order | | (LogicalFile)CUSTMAS<br>(LogicalFile)PRODUCT | (LogicalFile)INVCTL<br>(LogicalFile)INVOICE |
| (Create Order)Is the customer registered? | | (LogicalFile)CUSTMAS<br>(LogicalFile)INVPATH | |
| (Create Order)Register customer | (LogicalFile)CUSTMAS | | |
| (Process Mark)Confirm invoice | | (LogicalFile)CUSTMAS<br>(LogicalFile)PRODUCT | (LogicalFile)INVCTL<br>(LogicalFile)INVOICE |
| (Process Mark)Verify invoice | (LogicalFile)CUSTMAS | | |

FIG. 8

| Data Store | Deletes | Reads | Writes |
|---|---|---|---|
| (LogicalFile)CUSTMAS | (Create Order)Register customer (Process Mark)Verify invoice | (Create Order)Register customer (Process Mark)Verify invoice (Create Order)Is the customer registered? (Check Facts)INQMAP3 (Create Order)Create order (Process Mark)Confirm invoice | (Create Order)Register customer (Process Mark)Verify invoice |
| (LogicalFile)INVCTL | | (Create Order)Create order (Process Mark)Confirm invoice | (Create Order)Create order (Process Mark)Confirm invoice |

FIG. 9A

| | | | |
|---|---|---|---|
| (LogicalFile)INVOICE | | | (Create Order)Create order<br>(Process Mark)Confirm invoice |
| (LogicalFile)INVPATH | | (Create Order)Is the customer registered?<br>(Check Facts)INQMAP3 | |
| (LogicalFile)PRODUCT | | (Create Order)Create order<br>(Process Mark)Confirm invoice | |

FIG. 9B

| Business Rule | Business Process | Step (Node) |
|---|---|---|
| Customer number is mandatory | Take Order | Create Order |
| For each order at least one item should be included | | Create Order |
| Computation of invoice total | Take order | Create Invoice |
| Customer name must be entered | Take Order | Register customer |
| Address of customer is mandatory | | Register customer |
| Product must be available in inventory | Take Order | Create invoice |

FIG. 13A

| Business Process | Step (Node) | Business Rules Used |
|---|---|---|
| Take Order | Register Customer | Customer name must be entered |
| | Register Customer | Address of customer is mandatory |
| | Create Order | Customer number is mandatory |
| | Create Order | For each order at least one item should be included |
| | Create Order | Product must be available in inventory |
| | Create Invoice | Computation of invoice total |

FIG. 13B

⊟ 📋 Rules
  ⊟ 📋 Computations
    └ 📋 Computation of Amount
  ⊟ 📋 Decisions
    └ 📋 Customer must be registered in the file
  ⊟ 📋 Domain
    └ 📋 Possible values for term Action
  ⊟ 📋 Validations
    ├ 📋 Action may be 1 or 2 or 3
    ├ 📋 Address is mandatory
    ├ 📋 City is mandatory
    ├ 📋 Customer number is mandatory
    ├ 📋 First name of Customer is mandatory
    ├ 📋 For each product at least one item should be included
    ├ 📋 Last name of customer is mandatory
    ├ 📋 State is mandatory
    └ 📋 ZIP code of customer is mandatory

| ← → 🔖 ✂ × | Kind: | Validation | ˅ | Status: | Extracted | ˅ | 🔨Build | 📋 Select Code |

Rule Name: Address is mandatory

| Description | Code | Duplicates | Terms Used | Candidate Terms | Used by Process Steps |

[2200-EDIT-CUSTOMER-DATA]

IF   ADDR1 = SPACE
 OR ADDRL = ZERO
 MOVE ATTR = REVERSE TO ADDRH
 MOVE -1 TO ADDRL
 MOVE 'You must enter an address.' TO MSG20
 MOVE N TO VALID-DATA-SW
END-IF

| 395 | IF   ADDR1 = SPACE |
| 396 |  OR ADDRL = ZERO |
| 397 |  MOVE ATTR = REVERSE TO ADDRH |
| 398 |  MOVE -1 TO ADDRL |
| 399 |  MOVE 'You must enter an address.' TO MSG20 |
| 400 |  MOVE N TO VALID-DATA-SW |
| 401 | END-IF |
| 402 |   |

SYSTEM AND METHOD FOR CREATING A PROCESS FLOW DIAGRAM WHICH INCORPORATES KNOWLEDGE OF BUSINESS RULES

RELATED APPLICATIONS

The present application claims priority to and is a continuation in part of U.S. Ser. No. 17/013,130, filed Sep. 4, 2020, and entitled SYSTEM AND METHOD FOR CREATING A BUSINESS PROCESS DIAGRAM WHICH INCORPORATES KNOWLEDGE OF THE TECHNICAL IMPLEMENTATIONS OF FLOW NODES, which in turn claims priority to U.S. Provisional patent application Ser. No. 62/970,466, filed Feb. 5, 2020, and entitled SYSTEM AND METHOD FOR CREATING A PROCESS FLOW DIAGRAM WHICH INCORPORATES KNOWLEDGE OF THE TECHNICAL IMPLEMENTATIONS OF FLOW NODES; U.S. Provisional patent application Ser. No. 62/970,368, filed Feb. 5, 2020, and entitled SYSTEM AND METHOD FOR CREATING A BUSINESS PROCESS DIAGRAM; and U.S. Provisional patent application Ser. No. 62/970,556, filed Feb. 5, 2020, and entitled SYSTEM AND METHOD FOR CREATING A BUSINESS PROCESS DIAGRAM WHICH INCORPORATES KNOWLEDGE OF BUSINESS TERMS USED IN EACH STEP, the contents of which are herein incorporated by reference.

BACKGROUND OF THE INVENTION

The present invention is related to the creation of process flow diagrams, and is specifically related to the creation of process flow diagrams that are linked to and based on other system software.

As is known in the art, process flow diagrams are widely used for various purposes. In general, a process flow diagram consists of a number of nodes representing activities and edges between the nodes indicating the order in which the activities are to be performed. There can be nodes of various types, such as for example a "start node" or a "user task" or a "subsystem node." Existing software tools supporting the creation of process flow diagrams usually indicate for each node both the type of node and the name of the node, which is customizable. The edges of the process flow diagram can be annotated if desired to show a regular flow or a true flow (e.g., to be followed only when a condition expressed by the source of the edge is true) or a false flow (e.g., when the condition is false).

Process flow diagrams can be employed to describe a specific business process, such as for example, how a user interacts with a software system in order to achieve a specific goal. For instance, to create a new customer account at a bank, a clerk, such as an operator, may be using a software application called Accounts. The clerk may perform a number of "manual" steps, such as asking the customer various questions or calling a manager for approval. However, it is expected that most of the steps can be accomplished with the aid and through interaction with an Accounts software application.

Traditional process flow diagrams typically describe all the steps performed by the operator or clerk, as well as the order of the steps or possible branches in the process flow diagram. An operator can review the diagram and readily understand the process flow, such as in the above example how the clerk proceeds to create a new account.

A disadvantage of the traditional systems for creating the process flow diagrams is that the operator is unable to determine which software application or combination of software applications are employed, and how the software application which supports each of the process steps actually works, or the terms that are common between the applications. This missing information may be very important for the people who manage the application. For example, if a step or a flow in the process is to be modified for business reasons, it raises the questions whether the application system supporting the process has to be modified or more importantly which software applications, screens or tables need to be modified. Furthermore, the creator or the consumer of the process flow diagram may not know the specific ways in which the business is executing some steps. For instance, in a step called "Approve Loan," there may be a business rule entitled "The loan is approved only if the credit score of the applicant is over 700." In the same step, there may also be a formula for computing the interest rate for the loan, based on the credit score of the applicant.

SUMMARY OF THE INVENTION

The present invention is directed to a system and method for combining a process flow diagram with information related to the technical information or artifact and associated business rules of the software applications supporting the process (e.g., a supporting or target software application). This combination provides important information to the operator of the system or business analysts involved with the application. For example, a user of the system can determine which software applications are employed during the execution or creation of a process or process flow diagram, as well as which business rules are implemented at various steps. Further, if changes are made to the process flow diagram, the user can easily determine which software applications need to be modified as well. The linking together of process flow diagrams and associated data with data associated with underlying software applications is an object of the present invention.

The present invention also provides a system and method that associates the steps in a business process flow with a number of business rules involved in the steps. This association can be useful in the understanding of the software application functionality as well as in the understanding of the business processes that support the associated applications. To that end, the present invention is directed to a computer implemented method performed by at least one computer processor for associating a plurality of business rules with one or more portions of a process flow diagram, the method comprising extracting data from a plurality of software applications associated with a computing system to form extracted data; searching the extracted data for one or more patterns in software code in the form of code snippets associated with the plurality of software applications; forming the plurality of business rules from the code snippets; providing a process flow diagram having a plurality of nodes and a plurality of edges; associating one or more of the plurality of business rules with one or more of the plurality of nodes of the process flow diagram; and displaying the process flow diagram. The method also includes forming a mapping between each of the business rules and the code snippets, and the step of associating one or more of the plurality of business rules further comprises automatically establishing a relationship between the one or more of the plurality of nodes and the one or more business rules. The method can also include forming an association between the one or more business rules and the software applications via the code snippets.

The method of the present invention can also include generating a window having a plurality of tab elements, wherein a first one of the plurality of tab elements displays a list of business terms and a second one of the tab elements displays a list of the business rules, and the method can also include generating a table that includes a plurality of columns including a business rules column for setting forth the plurality of business rules, a business process column for setting forth a business process associated with each of the business rules, and a node column for identifying the node in the business process that is associated with each of the business rules and the business processes.

According to another aspect, the present invention can include generating a first window that displays a list of the plurality of business rules that are present within one or more of the plurality of software applications, selecting a first one of the plurality of business rules in the list, and generating a second window for displaying additional information associated with the first one of the plurality of business rules. The second window displays a first column that sets forth one or more of the business processes associated with the first one of the plurality of business rules and a second column that sets forth one or more of the nodes of the plurality of nodes that are associated with the first one of the business rules.

The present invention can also include extracting a plurality of technical artifacts from the extracted data associated with the plurality of software applications, and associating one or more of the plurality of technical artifacts with one or more of the plurality of nodes of the process flow diagram. When the node is actuated, the method includes displaying the associated technical artifact on a display. The step of associating further comprises selecting, by an operator, one or more of the plurality of business rules and then associating the selected business rules with one or more of the plurality of nodes, actuating the one or more of the nodes and selecting the associated business rule, and when the node is selected, displaying the business rule associated with the node.

According to still another aspect, the method includes actuating the node and selecting the associated technical artifact, displaying an architecture of the technical artifact, and displaying the relationship between the software applications and the other software applications by the architecture diagram.

Further, the method includes displaying the one or more business rules in a list, and when one of the business rules is selected, generating a window that displays information associated with the one selected business rule, wherein the information includes one or more business processes. Alternatively, the method can involve providing a search box for entry of one or more searchable business rules, and displaying a search result listing a plurality of fields that include the searchable business rules.

The present invention is also directed to a system for associating a plurality of business rules with a process flow diagram, comprising a data extraction unit for extracting data from a plurality of software applications, wherein the plurality of software applications includes one or more target software applications; a rule identification unit for searching the extracted data for one or more patterns in software code in the form of code snippets associated with the plurality of software applications, and for identifying the plurality of business rules from the code snippets; a process flow diagram unit for providing a process flow diagram having a plurality of nodes and a plurality of edges and for associating one or more of the plurality of business rules with one or more of the plurality of nodes; and a visual application unit for displaying the process flow diagram generated by the process flow diagram unit and for displaying the plurality of business rules from the rule identification unit. The system can also include a project explorer tool for receiving the technical artifacts and for forming a list of the technical artifacts, an architecture diagram unit for generating an architecture of each of the plurality of technical artifacts, and a visual application unit for displaying the process flow diagram generated by the process flow diagram unit and for displaying the technical artifacts from the project explorer tool.

According to one aspect, the data extraction unit extracts instances where at least one of the plurality of software applications accesses at least another one of the plurality of software applications, wherein the instances form the technical artifacts, or extracts instances when at least one of the plurality of software applications accesses a data store through a programmatic operation. The operator can select at least one of the technical artifacts and at least one of the plurality of business rules and associate the selected technical artifact and the business rule with at least one of the plurality of nodes. The project explorer tool further comprises a means to associate one or more of the plurality of nodes with one or more of the technical artifacts. The architecture of each of the technical artifacts generated by the architecture diagram unit can include programmatic relationships between the node representing the artifact and one or more of the nodes representing other technical artifacts.

According to still another aspect, the system of the present invention can include one or more computer processors programmed to display the plurality of nodes and edges and representing flows therebetween; display the plurality of nodes representing the technical artifacts and edges representing relationships therebetween; create the process flow diagram by selecting one or more of the plurality of node types and flow types and instantiating them in the process flow diagram; select one of the plurality of technical artifacts and associate the selected technical artifact with one of the plurality of nodes; select one of the business rules and associate the selected business rule with the one of the plurality of nodes; and generate an implementation relationship between the technical artifact and the process node, such that the technical artifact executes the process node.

The present invention is further directed to a non-transitory, computer readable medium comprising computer program instructions tangibly stored on the computer readable medium, where the computer program instructions are executable by at least one computer processor to perform a method, the method comprising extracting a plurality of business rules from a computing system having a plurality of software applications, wherein the plurality of software applications includes one or more target applications, the business rules being identified from code snippets in the plurality of software applications; generating a process flow diagram having a plurality of nodes and a plurality of edges; associating one or more of the plurality of business rules with one or more of the plurality of nodes of the process flow diagram; displaying the process flow diagram; and when the node is actuated, displaying the associated business rule.

The processor can be further programed to extract a plurality of technical artifacts from the plurality of software applications, associate one or more of the plurality of technical artifacts with one or more of the plurality of nodes of the process flow diagram, and allow an operator to select one or more of the business rules and then associating the selected business rule with the one or more nodes. Still further, the processor can be programmed to actuate the node and selecting the associated business rule, and when the node is selected, displaying the business rule associated with the node.

According to another aspect, the processor can be programmed to actuate the node and selecting the associated technical artifact, display an architecture of the technical artifact, determine the business rule associated with the data field, and automatically derive the relationship between the nodes and the business rules based on the association between the business rules and the data field. Still further, display the plurality of business rules in a list, and when one of the plurality of business rules is selected, generate a window that displays information associated with the one selected business rules, wherein the information includes one or more business processes.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 5 is a schematic diagram of the system of the present invention showing a process flow diagram in a first window and a separate window in which the architecture of the target application is shown, including the associated applications or software programs and the data stores employed by the application during execution of the operations associated with the nodes

FIG. 8 is a report that can be generated by the system of the present invention showing the process nodes and associated target application as well as the communications functionality associated therewith.

FIGS. 9A and 9B are reports that can be generated by the system of the present invention showing various data stores and programmatic functions that can be associated with a process node according to the teachings of the present invention.

FIG. 13A is a schematic depiction of a table listing the relationships between business rules, business processes and nodes according to the teachings of the present invention.

FIG. 13B is a schematic depiction of a table similar to FIG. 13A showing the relationships between business processes, process nodes, and business rules according to the teachings of the present invention.

FIG. 15A is a schematic depiction of the business rules that are identified by the rule identification unit according to the teachings of the present invention.

FIG. 15B is a schematic depiction of the list of embodiments associated with a business rule selected by an operator according to the teachings of the present invention.

FIG. 15C is a schematic depiction of the software code associated with the embodiments of FIG. 15B according to the teachings of the present invention.

DETAILED DESCRIPTION

Figure 1:
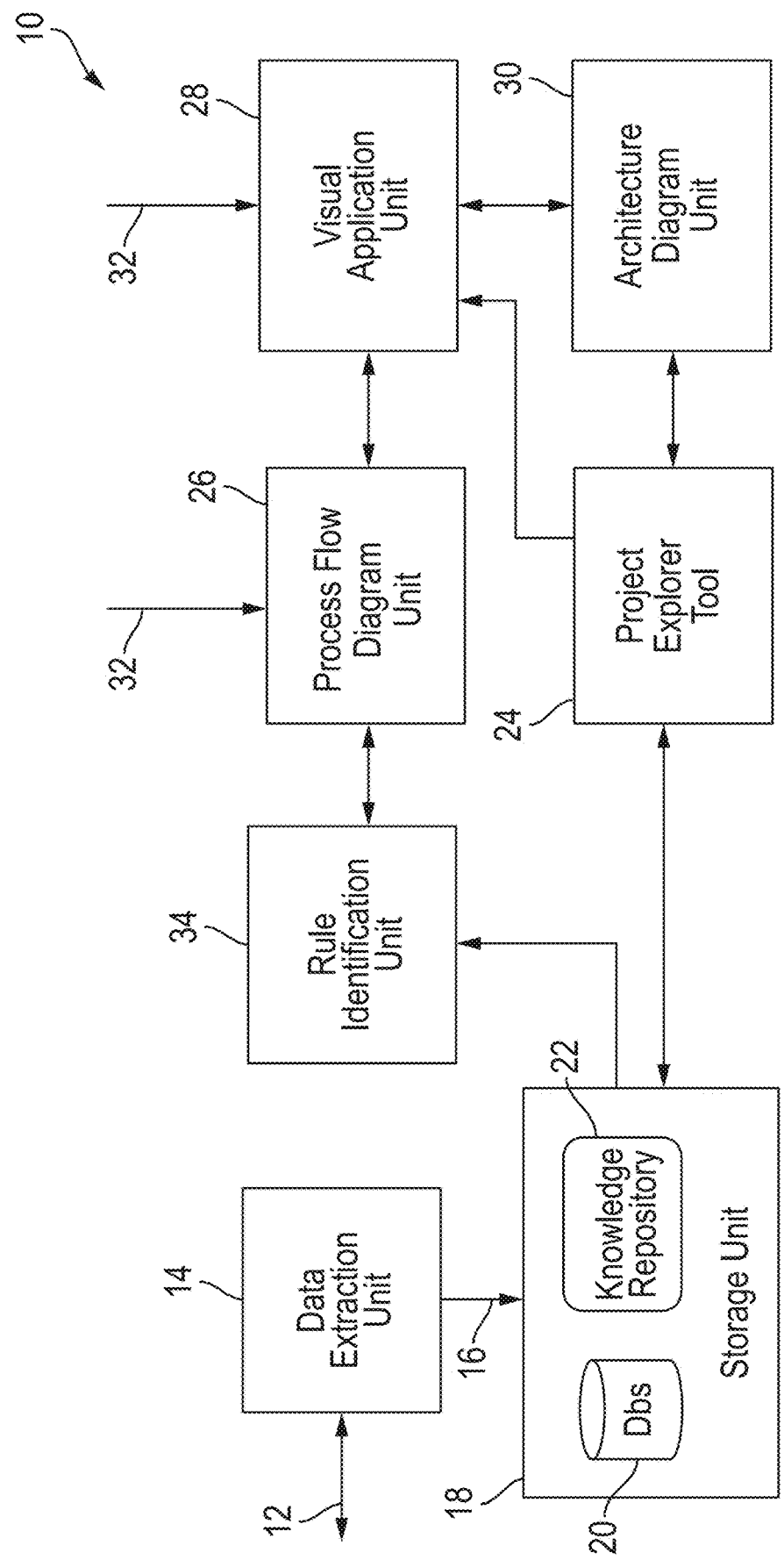
FIG. 1 is a schematic block diagram of the process flow identification system according to the teachings of the present invention.

The present invention is directed to a system and method for combining information associated with a process flow diagram with information related to the technical information or artifact and business rules regarding a supporting, target or underlying software application. This combination provides important information to the operator of the system or business analysts involved with the application.

The term "target application" or "supporting application" as used herein is intended to designate a software application or program which performs one or more operations under the direction of an operator, such as a human actor, related to an action performed by the operator, or related to the operation of another software application.

The term "operator" is used to designate the human or end user who is utilizing the system and the method of the present invention.

The term "end user" is used to designate a user of the target application or another software application.

The term "process node" as used herein is intended to designate a node on a process flow diagram, which describes a step in the execution of a process, as represented by the process flow diagram. In most process flow diagrams or models, this may be a start node, an end node, a task node, a subprocess node or a gateway node, or some other type of a standard or proprietary process model.

The term "process flow diagram" as used herein is intended to include any flow or method of a process that includes a series of functional steps or actions. The process flow diagram can include a series of nodes (process nodes) that are linked together by edges or flows. The process nodes and edges can have selected data associated therewith. For example, the process nodes can have data associated therewith about a specific step in the process, identification data, attribute data, technical artifact data, and the like. The edges or flows serve to connect selected ones of the process nodes together and can have data, such as attribute data, technical artifact data and the like associated therewith.

The term "business process" as used herein is intended to include a set or series of real world steps that are taken in a selected succession in order to achieve a business objective. The process can be represented by one or more process flow diagrams directed to business steps.

The term "technical feature" or "technical artifact" as used herein is intended to designate one or more supporting or underlying technical functions of the applications or system, and is utilized to support or execute programmatic operations or functions associated with one or more process nodes and/or edges of a process flow diagram. The technical function can include one or more software applications, one or more application components, one or more software objects, such as a screen or a window (i.e., user interfaces), one or more panes of the window, a page, a web service, a script, a table, a file, a batch job, or some other type of software component which describes an abstract representation of the technical function or software application. The technical artifact is intended to include and can be displayed using a graphical element or other abstract representation of the underlying artifact.

The term "user interface" as used herein refers to any technical artifact in a software application, which is used to present data to an operator or end user or acquire data from an operator or end user. The user interfaces can include screens, windows, panes, forms, pages or reports.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "data store" as used herein is intended to include any physical or logical device which holds or stores data, including data processed by the software application. The data stores can include tables, records, segments, indexed files or sequential files.

The term "code snippet" or "snippets of code" as used herein is intended to refer to a set of contiguous statements or lines of code in an application program. The snippet can include or consist of, for instance, an IF statement together with an associated THEN and ELSE branches or statements, or a WHILE statement or any other sequence of statements.

The term "architecture diagram" or "architecture" as used herein is intended to include a representation of relationships between any combination of user interfaces, software applications, software objects, and/or data stores of the technical artifact. The representations can indicate or show which software applications or programs communicate (e.g., take data or place data) with selected user interfaces, as well as which programs communicate with or call other programs and which programs access data stores to read, update, insert or delete data. The architecture diagram can show some or all of such relationships.

The term "business term" as used herein is intended to mean or include an abstract piece or portion of data which has a business related significance. Examples of business terms can include, without limitation, words, groups of words, phonemes, acronyms, partial words, or associated grouping or collection of letters, numbers and/or symbols. For instance, in a banking application, the business terms may include "account," "balance" or "credit score." While business terms are by their nature abstract and conceptual, they are embodied in the software application in the form of data elements, such as fields or members, in a program or a user interface or columns in a table. Thus, a single business term may be implemented throughout or located in many different fields or members or columns, and can have the same or different names. While intimately related to the data elements which appear in the application, a business term is not by itself construed to have a software connotation. The data elements which appear in the target application may embody or implement various business terms, such as for example a field which appears in the application code as "prod_price" that can be an embodiment of the term "product price". On the other hand, other types of data elements in the application code, such as for example indices or flags or intermediate computation results, may not have any business meaning and therefore they do not embody business terms. In a further example, in a common business-oriented language (COBOL) application, the term Transaction Date may appear to be implemented in a field called TRANSACTION-DATE, or TRANS-DT or TRANSDTI. The system and method of the present invention can not only locate the terms that are being used, but can also determine where the terms are being implemented throughout the application. Further, the application code may use many other types of data elements which are not necessarily business terms, such as for example fields which can be used as indexes or as switches to control the execution of one or more programs.

The term "business rule" as used herein is intended to mean a particular manner, way or rule in which an organization computes, validates or derives data or makes decisions. For example, in a banking application program, some business rules may include "The owner of the account must be at least 18 years old," or "A fee of $5 is charged to the account every month," or "The loan cannot be approved if the credit score of the requestor is less than 600," or "The maximum mortgage cannot exceed 90% of the value of the property." While the rules are can be abstract and conceptual, they can also be embodied in the software application in the form of snippets of code embedded in various programs. For example, a single business rule may be implemented multiple times in the code of the same software application, or in multiple different software applications. While the rules may be implemented in the software code, a business rule need not be construed to be the same as the code itself. Furthermore, not all code embodies business rules, such as, for example, code dedicated to the formatting of a report or a web page.

The process flow identification system 10 of the present invention is shown in FIG. 1. The illustrated system 10 employs a computing system that has one or more units, modules, systems, or sub-systems. According to the present invention, the system 10 includes a data extraction unit 14 for acquiring or extracting data 16 associated with the various types of communication between software applications employed by the system 10 or between the system 10 and one or more associated systems or software applications. The data extraction unit 14 can capture the relationships between various technical artifacts involved in the various applications employed by the system 10, and can extract or acquire this information via the communication channel 12. In particular, the data extraction unit 14 can acquire and/or extract the instances where software applications, functions, or methods are communicating with other software applications, functions or methods in the system 10 or associated systems or software applications. For example, and according to one practice, the data extraction unit 14 can capture, acquire or extract instances where a software application or function or method communicates with another software application or function or method, such as for example through a system call with a return or one without a return (e.g., an exclusive transfer of control). The data extraction unit 14 also captures or extracts the various instances when a software application or function or method is accessing a data store, such as a table or record or file, through a programmatic operation, such as a read, write, select, update, insert or delete operation. The extracted data 16 as acquired, captured or extracted helps establish the connections between the process flow steps as seen by a human and the operations performed by the target or supported application. The data extraction unit 14 can be implemented using known reverse engineering tools or applications, such as for example by using software analysis tools, and preferably software static analysis tools. Examples of suitable software static analysis tools includes Apache Yetus, Axivion Bauhaus, Coverity, and the like. Further, the communication channel 12 is represented in simplified form for ease of illustration and can be any selected communication mechanism or technology that allows the data extraction unit 14 to communicate with other elements, applications and/or components of the process flow identification system 10, and includes for example one or more buses, memory and the like.

The illustrated process flow identification system 10 further includes a storage unit 18 for storing the extracted data 16 that is received from the data extraction unit 14. The storage unit 18 can be any selected type of storage unit 18 as is known in the art. According to one practice, the storage unit 18 can include a database 20 for storing the data 16. The database can be any selected type of database, and is preferably a relational database. The database 18 serves as a storage device for a knowledge repository 22, which can be implemented in connection with (e.g., on top of) the database, and which can be configured to store the extracted data 16 as well as any description of any associated process flow or process flow diagrams. Consequently, the knowledge repository 22 can be used to store and make available for retrieval information associated with and about the software application architecture as well as the process flow diagrams referenced herein.

With further reference to FIG. 1, the storage unit 18 communicates with a project explorer tool or application 24 for identifying from the extracted data 16 and then displaying in any selected form or format, such as in a list format, the technical artifacts, which can include for example representations, such as abstract or graphical representations, of screens, batch jobs, programs, user interfaces, and/or data stores that are acquired or extracted by the data extraction unit 14. Once displayed, such as for example via the visual application unit 28, the operator can inspect the list of technical artifacts and any associated properties, and if desired select one or more of the technical artifacts for further action or processing. The project explorer tool 24 can also communicate with if desired a process flow diagram unit 26 for allowing the operator through a user selection unit or means 32 to create, generate, or import nodes in a process flow diagram. Specifically, the process flow diagram unit 26 allows the operator to display a process flow diagram either imported or created and also allows the operator through the user selection unit 32 to manipulate, such as add, delete or modify, process flow nodes and edges therein. The user selection unit 32 can employ if desired any known type of user section device or mechanism, such as a computer mouse or keyboard, to allow or enable the operator to select a feature, option or element from the displayed information. The project explorer tool 24 also helps connect, link or associate one or more flow nodes with one or more of the technical artifacts, such as screens. This association is automatically created when the user selects a technical artifact to create a flow node based thereon. For example, when the user selects a representation of a screen, a flow node is created indicating that in the flow diagram process the user or operator utilizes that screen to perform a selected action, and the flow node is then automatically associated with this screen. The process flow diagram unit 26 can also communicate with a visual application unit 28 for displaying the process flow diagram created by the process flow diagram unit 26 as well as the technical artifacts acquired or extracted by the data extraction unit 14. Further, the visual application unit 28 allows the operator through the user selection unit 32 to modify, edit or delete any of the selected information displayed therein. Hence, the extracted data 16 and the associated technical artifacts, business rules, and the process flow diagram data, as well as other aspects of the system, can be displayed.

The process flow identification system 10 can also include an architecture diagram unit 30 which can generate the architecture around selected technical artifacts and display the architecture of the technical artifacts via the visual application unit 28. The architecture of the technical artifacts includes programmatic relationships, such as programmatic calls, reads or send requests, represented as edges between boxes representing the technical artifacts. The architecture diagram unit 28 can thus retrieve and store data associated with the technical artifacts. The architecture diagram unit 30 can be a separate stand-alone unit or can form part of the process flow diagram unit 26. An example of an architecture of a technical artifact is shown for example in FIG. 7. While the process flow diagram shows the nodes or steps in a process, and thus are at a higher level of abstraction, the architecture diagram can show or illustrate the actual technical implementations associated therewith. Thus, according to the present invention, these two types of diagrams are related, as each process node in the process flow diagram has an association with a technical artifact node in the architecture diagram.

The process flow diagram unit 26 can be implemented using various metamodels, which can be proprietary or standard. As is known, metamodeling is the analysis, construction and development of the frames, rules, constraints, models and theories applicable and useful for modeling a predefined class of problems, such as steps in a business process. The process flow diagram unit 26 according to one practice can also be implemented using known process flow modeling applications that are capable of generating and/or describing the nodes and edges of a process flow diagram, such as for example by a Business Process Model and Notation (BPMN) application or a Unified Modeling Language (UML) application.

The illustrated process flow identification system 10 of the present invention can also include a rule identification unit 34 for receiving the extracted data 16 from the storage unit and then searching and identifying therein one or more rules, such as business rules, that are in the extracted data. The rule identification unit 34 finds business rules by searching the application code for certain code patterns. By way of a simple example, in a common business-oriented language (COBOL) application, the operator may look for the code in which the data element LOAN-APPROVED is set to the value "Yes." The code that is found and that is associated with this search may include, for example, the data element IF CREDIT-SCORE<600 THEN LOAN-APPROVED="No." A business rule can be inferred from the associated code "The credit score must be at least 600," which is stored in the system. The code that is found is the embodiment or implementation of this business rule.

The process flow identification system 10 and associated method described herein can be implemented by a number of different and various operations. The operations associated with the process flow diagram can be performed in a certain pre-determined or fixed order or may be performed in a preferred order as the process flow diagram is edited and modified by the operator. The description below sets forth the process flow steps in a selected order as the flow diagram is initially constructed or created by the process diagram unit 26. The operator of the system and associated method can then modify or edit the process flow diagram as desired. The process flow identification system 10 of the present invention allows the operator via suitable input data or commands 32 to create a process flow diagram and connect certain nodes of the process flow diagram to representations of the technical artifacts (e.g., screens, windows or forms) in or by which the node or step is implemented in software. This may be accomplished in various ways.

According to a first implementation, the process nodes can be connected with the technical artifacts or more specifically with the representations of the technical artifacts by importing the technical artifacts, as well as business rules, into a previously created or imported process flow diagram. This can be generally accomplished via any suitable manipulation or control mechanism or user selection device, such as a conventional drag and drop operation in which the selected technical artifact as displayed in a display via the visual application unit 28 is grabbed with the user selection device, such as a mouse, and is dragged and a dropped into the process flow diagram by the operator. Alternatively, the operator can select the technical artifact as displayed via the project explorer tool 24 and the visual application unit 28 and can use a menu or a soft button feature to include or import the technical artifact into the process flow diagram. When the technical artifact is imported into the process flow diagram, the artifact is automatically transformed into a process node entity and a relationship between the specific process node and the originally selected technical artifact, designated as an "implementation" relationship, which is recorded and stored together with other information about the process flow diagram. The "implementation relationship" is a relationship between a flow node in a process flow diagram and a technical artifact (e.g., a representation of the technical artifact), where the technical artifact can appear in an associated architecture diagram generated by the architecture diagram unit 30. The user can then, if desired, modify the name of the resulting node to a more user friendly and business-related node name, such as for example "Create order" or "Ship the product." As the nodes in the process flow diagram are created by the operator, the operator can subsequently connect the nodes with edges or arcs representing process flows so as to form or create a sequence of steps, indicating for instance that the user can first execute the step "Create order" and then next execute the "Ship the product" step.

According to a second implementation, the operator can create the process flow node so as to form a process flow diagram. According to one practice, the operator can add one or more process nodes of various types to the process flow diagram by selecting the node from a toolbox (e.g., list of nodes), and then drag and drop the selected node into the process flow diagram. After the node is created, the operator can rename the node as desired. The resulting nodes can then be joined by edges or arcs representing process flows. At each point, after a process node is created, the operator can select a technical artifact from a list of technical artifacts (e.g., representations of technical artifacts) provided by the project explorer tool 24. Once associated with the node, the system 10 and specifically the project explorer tool 24 or the process diagram unit 26 connects the technical artifact to the process node via the implementation relationship. This can be performed using soft buttons, menus or drag and drop features, in which the technical artifact is grabbed from the project explorer tool 24 and dropped over or on the displayed process node.

The operator may also use a combination of the two above technical artifact association methodologies. As described above, each of the process nodes can have optionally associated therewith a technical implementation, which is an implementation relationship with an associated technical artifact. However, there may be a node in the process flow diagram that requires operator action rather than an action to be performed by one or more applications of the system 10. By simple way of example, the process flow diagram can include a node named "Receive phone request," which is a step that occurs through human interaction as opposed to actions performed by a software application. This may be followed by nodes in the process flow diagram that are implemented by software, such as for example "Sign into the Accounts application."

Figure 2:
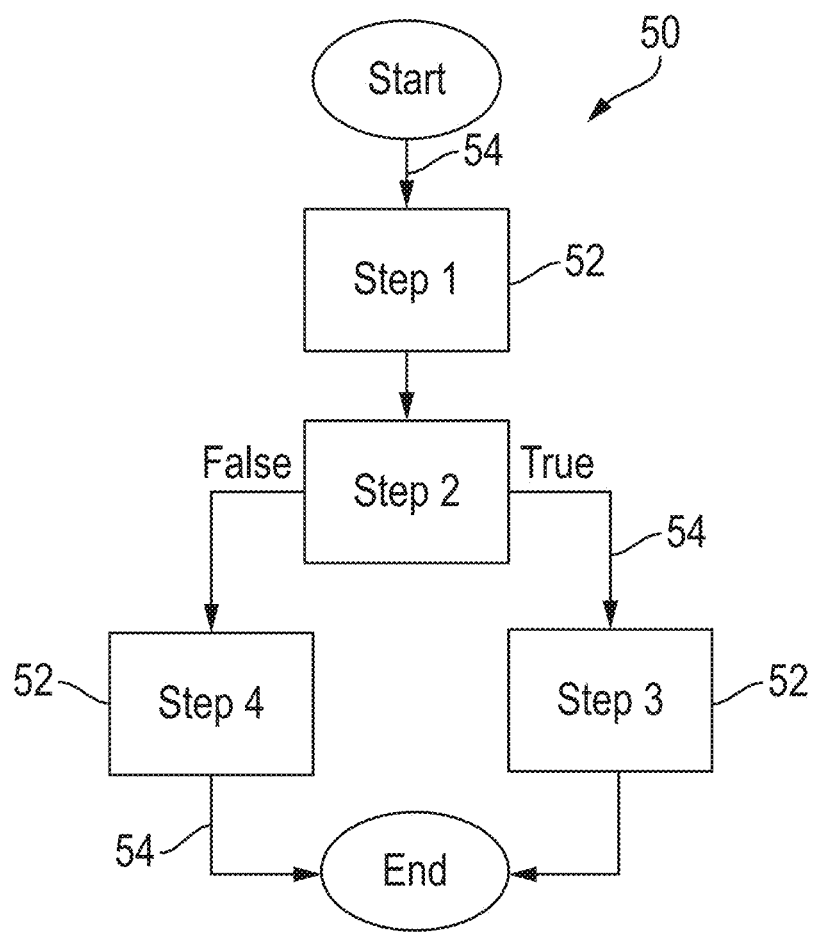
FIG. 2 is a schematic flow chart diagram of a simple traditional process flow diagram, with a start node, one or more task nodes, flow branches, and an end node.

FIG. 2 is an example of a conventional process that can be implemented by a conventional process flow diagram 50. The process flow diagram 50 can be implemented by the process flow diagram unit 26 using various metamodels, including for example the BPMN or UML applications. As shown, the illustrated process flow diagram 50 includes a series of nodes or steps 52 that are connected by a series of arcs or edges 54. The process flow diagram 50 starts at a Start node and then the process proceeds to step 1, which can be associated with one or more automated or manual tasks. The step 1 node 52 then proceeds to the step 2 node 52, and any task associated therewith can be performed by the system and/or the operator. The nodes in the process flow diagram 50 are coupled by arcs or edges 54. After the step 2 node, the process flow branches into a pair of branches corresponding to steps 3 and 4. For example, if the condition set forth in step 2 is true, then the process flow diagram proceeds to the node corresponding to step 3, and if the condition is false then the process flow continues to the node corresponding to step 4. After the steps are completed, the process ends at the end node.

Figure 3:
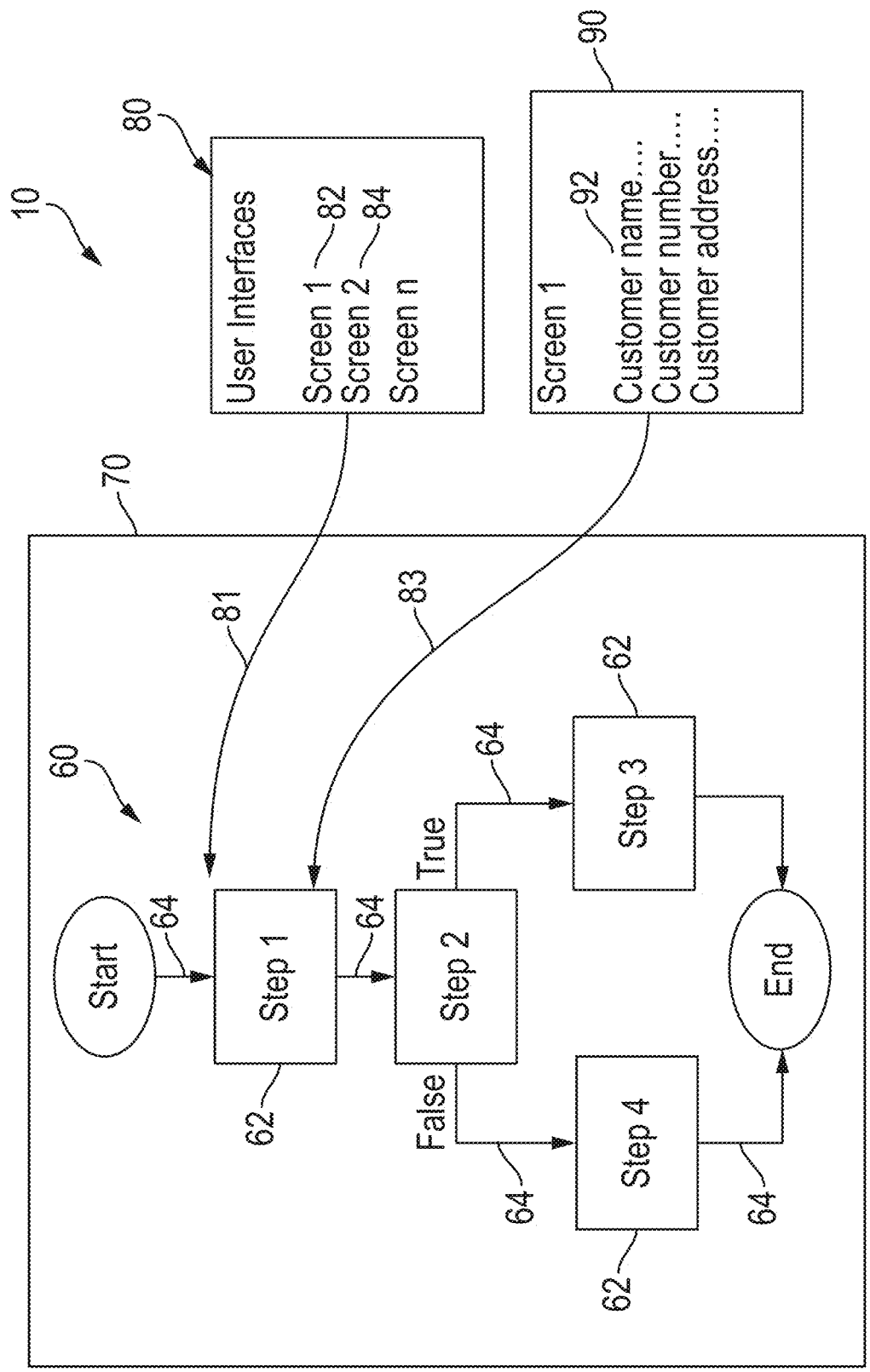
FIG. 3 is a schematic depiction of a process flow diagram on a display with one or more technical artifacts from a list of technical artifacts imported into the process flow diagram by an operator according to the teachings of the present invention.

In contrast to the conventional process flow diagram 50, the process flow identification system 10 of the present invention also displays in addition to the process flow diagram a set of technical artifacts that the operator can relate, assign or connect with selected steps of the process flow diagram. FIG. 3 illustrates the process flow identification system 10 generating and/or displaying a process flow diagram 60 and then showing the interaction between one or more nodes in the process flow diagram 60 with one or more technical artifacts. The illustrated process flow diagram 60 is displayed on a display 70, such as via the visual application unit 28 or the process flow diagram unit 26. The extracted data 16 can include information associated with the technical artifacts as well as data associated with business terms. As shown, the project explorer tool 24 identifies the technical artifacts involved in or associated with the various applications and the technical artifacts can be connected to the one or more nodes of the process flow diagram 60. According to one example, the technical artifacts can be displayed in any selected form or format, such as for example in list form, by the project explorer tool 24. The list of technical artifacts 80 can include screens or user interfaces, windows, forms, methods, tables, files, and the like, and in the illustrated example includes user interfaces such as windows or screens of the one or more target applications. The list of user interfaces includes for example Screens 1-n. The user interfaces of the target application are usually limited in number, and can range from a single user interface to a several hundred interfaces. A large number of user interfaces makes the target application difficult to understand and use by the operators who utilize the process flow identification system 10 of the present invention. For example, if one of the process steps in a process flow diagram is "Confirm reservation," a user interface may be identified, within which the user of the target application is confirming a reservation.

The illustrated process flow diagram 60 includes a plurality of nodes 62 that are named Steps 1-4, and are connected via associated arcs or edges 64. The illustrated process flow diagram 60 can be created by the operator by employing the process flow diagram unit 26. The process flow or the process flow diagram 60 can include multiple different steps or actions. For example, the initial step or action can involve constructing a process as seen by the people, users or operators who perform the actions. For simple ease of explanation and in an illustrative example, a hypothetical bank clerk can interact with a customer and may (1) ask the customer what type of account she wishes to open, (2) login to the Accounts application on her computer, (3) enter customer data in the screen or display, (4) save the entered data in the application, (5) from a soft button on the display generate a new customer account, and then (6) print the information about the account and hand it to the customer. The foregoing steps 1-6 can be implemented as process nodes that described the steps or actions in the above process, while the flows or edges between the nodes describe the order of operations. The edges need not be strictly sequential. For example, the clerk may ask if the customer wishes to open a personal account or a business account. At this point, there is a branch in the flow, and depending on the answer, the clerk may follow one branch or the other.

With reference again to FIG. 3, the nodes 62 named STEPS 1-4 are associated with selected steps or actions in a selected business process. Once the process flow diagram 60 is generated, the operator 32 can import 81 one or more technical artifacts 82, 84 (e.g., a selected user interface) from the list of technical artifacts 80 into the process flow diagram 60. The list of technical artifacts 80 (e.g., representations of the technical artifacts) can be displayed in a separate window or pane. According to one practice, the operator can import 81 via a drag and drop operation one of the technical artifacts 82 (e.g., Screen 1) into a flow node of the process flow diagram 60. The operator can associate or connect the imported technical artifact 82 with a selected node 62 (e.g., node Step 1) of the process flow diagram. Those of ordinary skill in the art will readily recognize that the technical artifact can also be imported by other techniques, such as by selecting the technical artifact from a toolbox or through a software menu. Alternatively, rather than drag and drop the technical artifact onto a node, the technical artifact can be dropped on the process flow diagram 60 in general. The operator then associates the imported technical artifact with an implementing user interface of the one or more target applications, such as for example by drawing a line between items in the diagram. The operator can view the imported Screen 1 by actuating 83 the node via a user selection device or unit if the technical artifact is associated therewith or by clicking on the imported artifact. The particulars 92 of the technical artifact 82 (e.g., Screen 1) can then be displayed, and are set forth in display window 90. The particulars can include any selected information or data about the technical artifact, and which is preferably related to the subject matter of the process flow diagram. The particulars 92 of the Screen 1 can include, in the current hypothetical example, the customer name, number and address. This process can continue for each process node 62, and hence if desired additional technical artifacts (e.g., Screens) can be associated with additional nodes 62. This enables the operator and the system 10 to determine which underlying technical artifacts, such as windows or panes, are used by a specific process node 62 in the process flow diagram 60. For example, the node 62 entitled Step 1 can be associated with the Screen 1 artifact 82 from the list of artifacts 80. The importing process can continue until the pertinent technical artifacts are associated with the corresponding nodes 62.

According to another optional practice, the operator can right click via a mouse on a selected node 62 (e.g., Step 1 node) and obtain a context menu, with a submenu feature entitled in the current hypothetical example "Connect to a user interface." When clicked, the menu shows a list of user interfaces 80 (e.g., technical artifacts) in the target application, and the operator selects one of the interfaces (e.g., Screen 1) in the list. Conversely, the operator can select a user interface from another window or pane, right click thereon and then click on "Connect to a process step" submenu.

Figure 4:
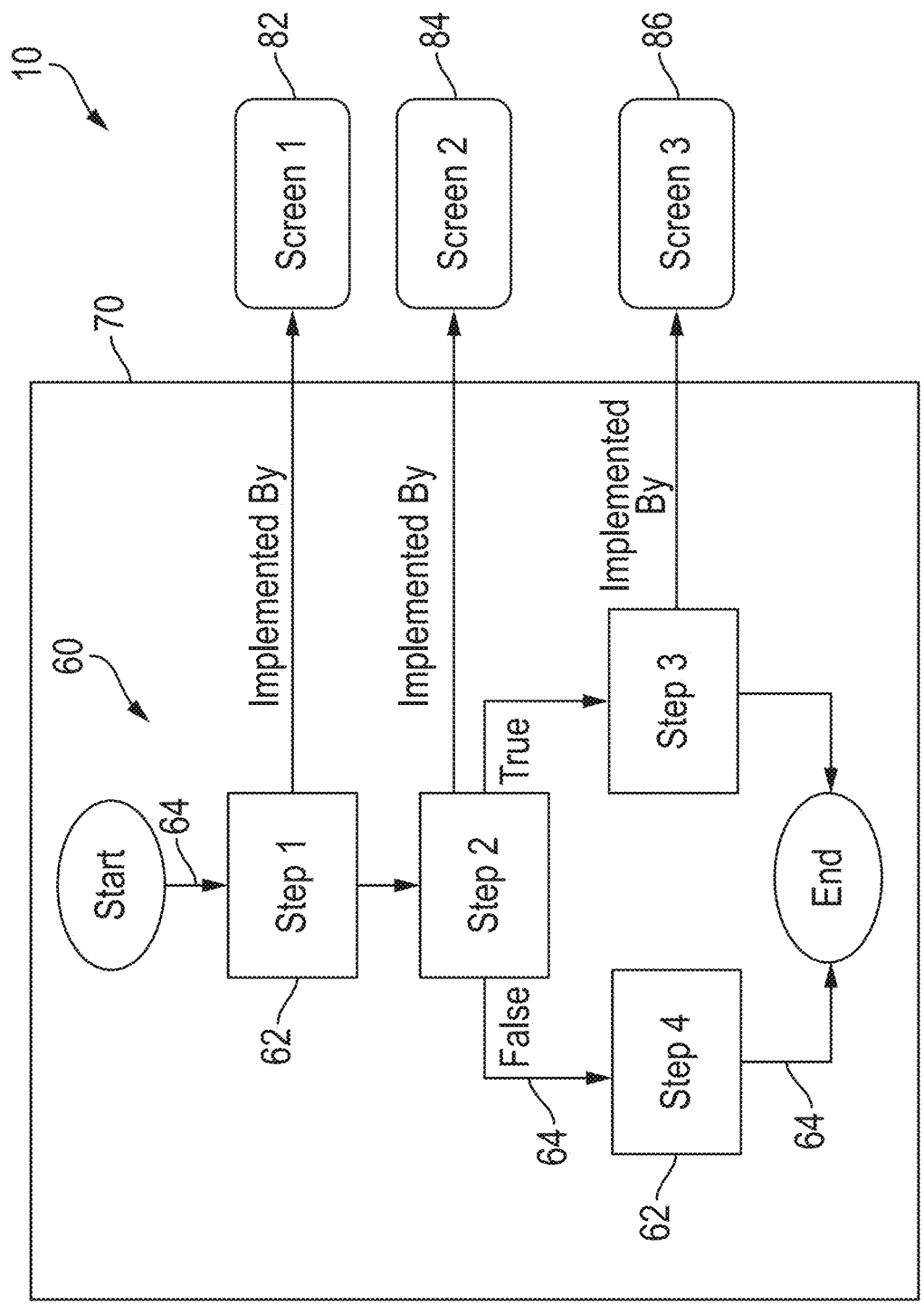
FIG. 4 is a schematic depiction of a process flow diagram on a display with a plurality of technical artifacts from a list of technical artifacts imported into the process flow diagram by an operator and assigned to selected process nodes according to the teachings of the present invention.

FIG. 4 shows the relationship between the nodes 62 in the process flow diagram 60 and the technical artifacts 82, 84, 86 after the artifacts are imported 81 into the process flow diagram 60. The operator can access and display the target artifacts that are supporting or implementing the operations associated with the nodes 62 and edges 64 of the diagram 60. For example and by way of illustration, the node 62 entitled Step 1 is associated with and implemented by the Screen 1 technical artifact 82; the node 62 entitled Step 2 can be associated with and implemented by the Screen 2 technical artifact 84; and the node 62 entitled Step 3 can be associated with and implemented by the Screen 3 technical artifact 86. Consequently, the system 10 can display to the operator not only the steps in the process flow diagram 60, but also the individual user interfaces or screens (e.g., technical artifacts) of the underlying target applications that are used at each step of the process and which are supported thereby.

FIG. 5 illustrates the process flow diagram 60 and a separate window or pane 100 in which a fragment or a portion of the architecture 110 of the target application to which the technical artifact belongs is shown, including the associated target and other applications or software programs 102, 104 and the data stores 106, 108 employed by the target application during execution of the operations associated with one of the nodes 62. The contents of the illustrated window pane 100 can be generated by the architecture diagram unit 26, and can be copied or imported into the process flow diagram 60 by the operator, such as for example by a drag and drop operation.

Figure 7:
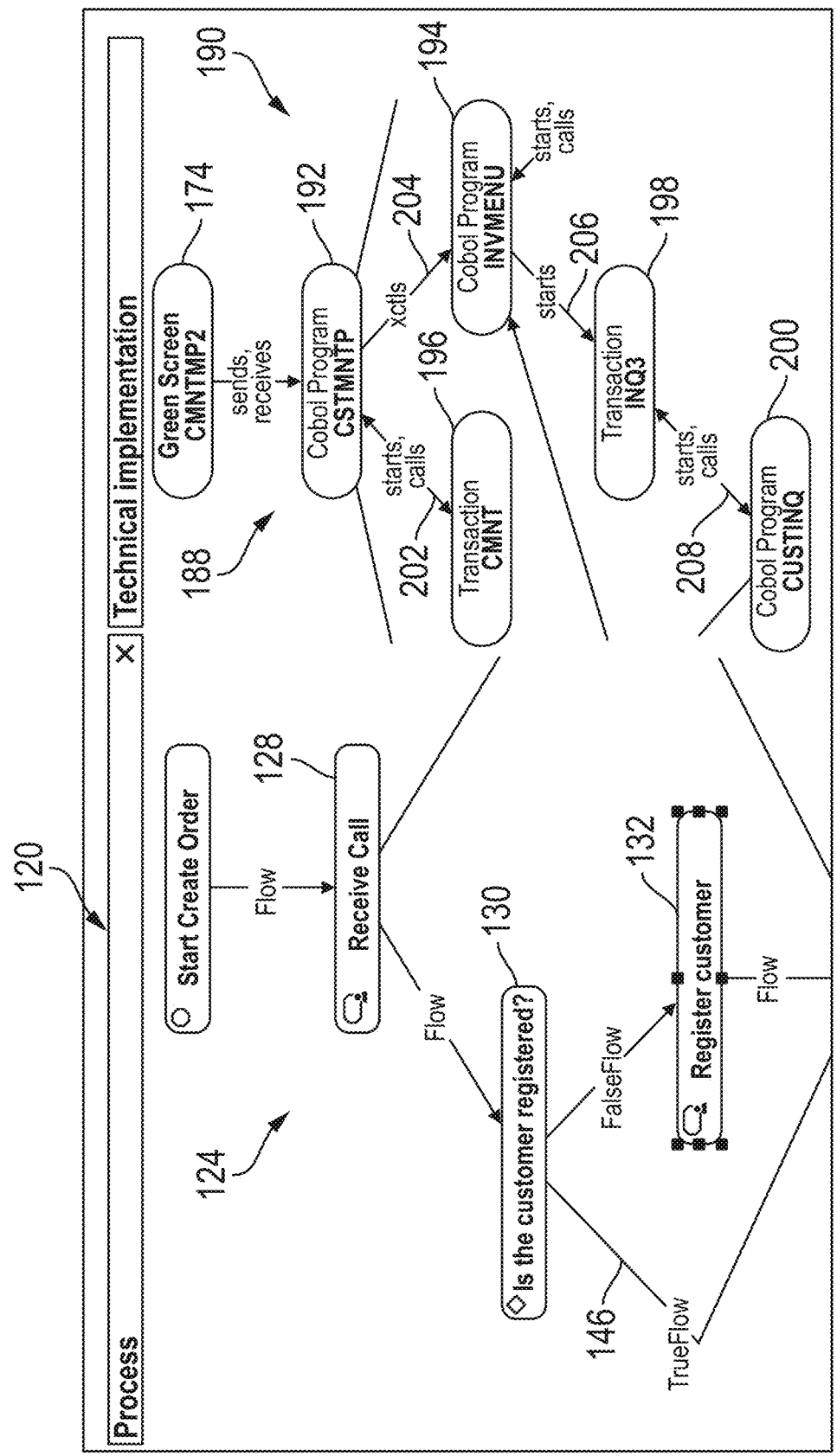
FIG. 7 is a schematic representation of a window or pane element in a display that shows the specifics of the target applications and associated communications therein or therebetween that are associated with a selected node in a process flow diagram according to the teachings of the present invention.

As shown, the node entitled Step 1 can have a technical artifact, such as artifact 82, associated therewith. The operator can actuate or select the node Step 1 and then the system generates the window 100 showing at least a portion of the architecture 110 of the associated technical artifact. With regard to the illustrated window 100, the technical artifact 82 entitled Screen 1 can be associated with a target application or one or more other technical artifacts and can be expanded by the operator to display therein the architecture of the technical artifact. The technical artifact can optionally have other artifacts associated therewith, and can include other technical or programmatic operations or functionalities, such as programs called or executed, such as for example Program 1 102 and Program 2 104, as well as data stores, such as File 1 106 and Table 1 108. The expansion of the technical artifact 82 can be triggered, for example, by a submenu of a context menu accessed by a right-click on the box designating the user interface or Screen 1. The expanded content associated with the user interface (e.g., list of artifacts 80) can be triggered by a menu or submenu of the window 70 that shows the process flow diagram 60, or can be implemented by a function key which becomes active once the window is selected. FIG. 7 is a suitable example of an expansion of a technical artifact associated with a node in the flow diagram 60.

The expansion of the user interface box or window can be done one step at a time or multiple steps at a time. For example, if an expansion is requested starting with the user interface box (UI box), the system 10 of the present invention can create another box (program box) designating a program which communicates with the user interface. Then the operator can select the box designating a selected program (e.g., programs 102, 104) and then expand the program box, and as a result another box appears designating a program called by the previous program. The same step can be repeated multiple times, and as a result, the operator can display and determine not only the immediate user interface on which the target application user acts, but also the additional applications associated with the technical implementation of the functionality of the user interface. As a result, the process flow diagram 60 can display the process steps while simultaneously the architecture diagram unit 30 can display in the window 100 the technical artifacts which assist with the implementation of the functionality of the target application utilized by the process flow diagram. The concurrent display of the two diagrams (the process flow diagram and the architecture diagram) is illustrated for example in FIG. 7.

Figure 6:
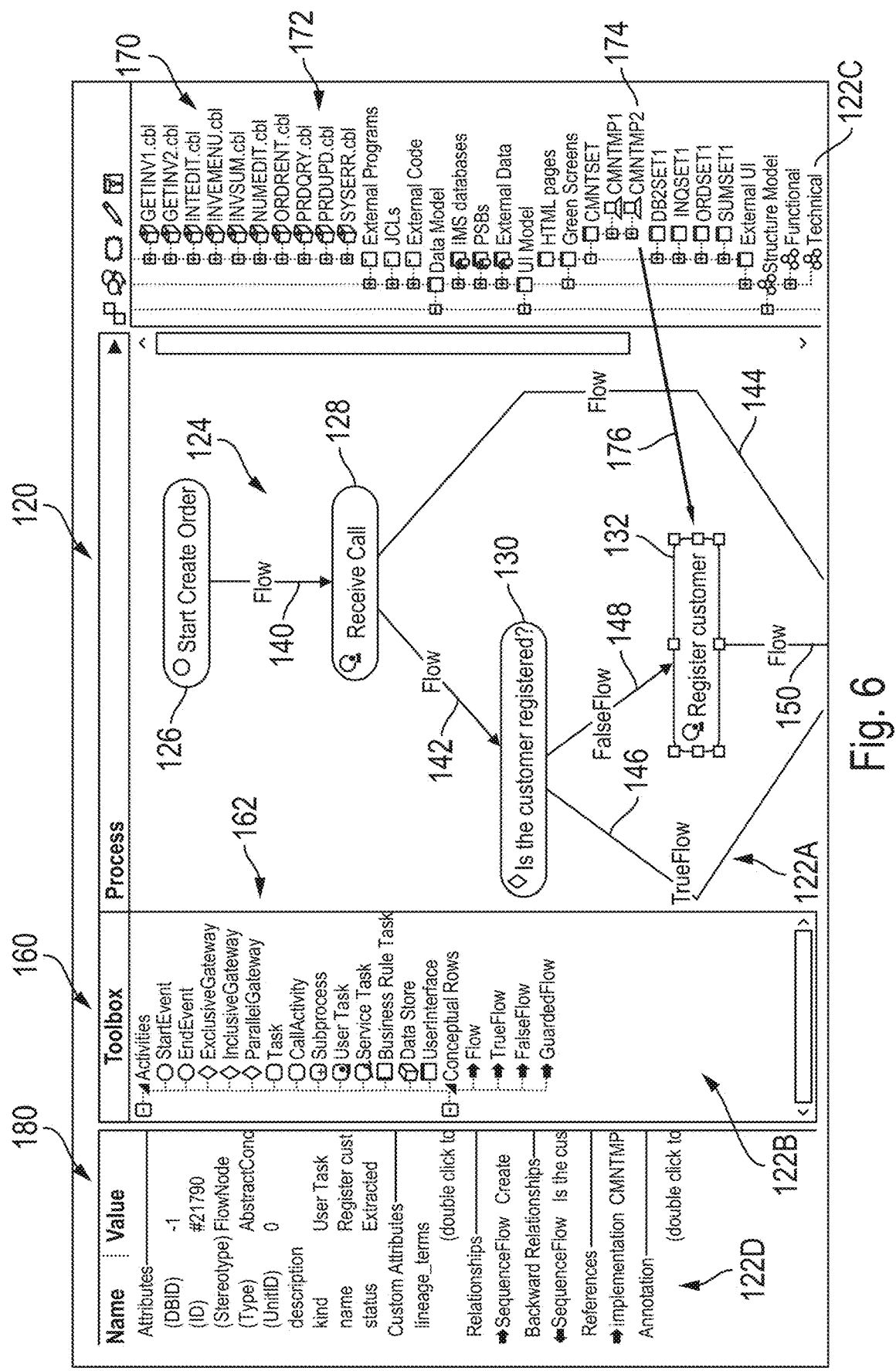
FIG. 6 is a schematic diagram of a window displayed by the system of the present invention illustrating a process flow diagram, a toolbox of node creation items, a list of technical artifacts importable into the process flow diagram, and an implementation relationship between target software applications and one or more nodes in the process flow diagram when associated with a technical artifact.

FIG. 6 is a schematic depiction of a window 120 viewable on a display device of the visual application unit 28 according to the teachings of the present invention. The window 120 can be displayed by the visual application unit 28 of the process flow identification system 10 of the present invention. The window 120 displays in a central pane element 122A a process flow diagram 124 generated by the process flow diagram unit 26. The process flow diagram includes nodes 126, 128, 130 and 132 and includes edges or flows 140, 142, 144, 146, 148 and 150. The illustrated nodes can be created by selecting one or more of the node creation item types set forth in the illustrated node menu list or toolbox 160. The toolbox 160 can be displayed in a left pane element 122B. As shown, the toolbox 160 lists or sets forth different types of node generating items 162 that are selectable by the operator. Once selected, a corresponding node is generated or created and then displayed in the window 120 as part of the process flow diagram 124. Once the nodes are created, the operator can assign or select edges or flows that link or connect together selected nodes. The edges or flows are illustrated in the process flow diagram 124. The operator can then select one or more technical artifacts 172 from a list of technical artifacts 170 (e.g., representations of the technical artifacts). The list can be displayed in a right pane element 122C of the window 120 or in a separate window. The technical artifacts 170 are extracted or acquired by the data extraction unit 14 and displayed via the project explorer tool 24 and/or the visual application unit 28. The operator can select via a user selection device one or more of the listed technical artifacts, such as by clicking on the corresponding artifact or by performing a drag and drop operation with a mouse device, and then associate the selected artifact with one of the illustrated nodes 126-132. The system 10 then creates an implementation association between the node and the selected technical artifact. The implementation associations can be set forth in a list of associations 180 that set forth information of the associated target software applications that are implementing the operations or instructions associated with the nodes and/or flows of the process flow diagram 124. The implementation list 180 can be displayed in a separate window or as a pane element 122D of window 120. The information associated with the implementation list 180 can include any selected type of identification and attribute data, including for example names and values associated with attributes of the target applications, relationship information, reference information, identification information and the like. In the illustrated list of technical artifacts 170, the operator can select for example a selected screen, such as screen 174, and then drag and drop or import 176 the selected screen into the process flow diagram 124 and associate the technical artifact 174 with a selected node, such as for example node 132. The node 132 is hence linked with the technical artifact 174. Further, the system 10 automatically creates an implementation relationship 180 between the process node 132 and the selected technical artifact 174, as well as with any selected target software application.

The node 132 can be actuated by the operator by clicking on the process node with an actuation or user selection device, such as a mouse. Once actuated, the technical artifact 174 associated with the node 132 and the target application corresponding to the technical artifact can be displayed. FIG. 7 for example illustrates the process flow diagram 120 of FIG. 6 and illustrates the window or pane element 190 that can be displayed when the node 132 is actuated. The window or pane element 190 can show the architecture 188 of the technical artifact 174 associated with the node 132. The technical artifact 174 can correspond, for example, to a selected screen. The target application associated with the screen can also be displayed, along with a series of communications (e.g., calls) between components or portions of an application as well as between various target applications. As shown, the pane element 190 can display the target applications 192, 94, 196, 198, and 200, as well as the communications or calls 202, 204, 206, and 208 between the applications. Thus, the pane 190 displays a section or section of the architecture which implements the functionality of the selected node 132.

FIGS. 1, 8 and 9A and 9B illustrate reports that can be generated by the process flow identification system 10 of the present invention. Specifically, the illustrated report generator 40 can be employed to generate the reports. The generation of the report can be triggered by a menu item or a button available in system 10. FIG. 8 illustrates a report 220 that shows the specific data stores that are accessed at each process node, as well as the kind or type of access that occurs. The report can arrange the information in any selected format, and preferably displays the information in a tabular format. The illustrated report 220 can include in a first column 222 the process nodes of the process flow diagram that are associated with programmatic functions or system calls. As shown, the identification data (e.g., names) associated with the process nodes can be provided, along with optionally the technical artifacts that are associated therewith. Column 224 in the table 220 provides information associated with the files or tables that the corresponding process node executes delete operations. Column 226 shows on which files or tables the process node executes read operations. Column 228 shows on which files or tables the process node executes write operations. The columns 224, 226, and 228 of the report 220 can also set forth different types of programmatic functions or operations that are associated with the target applications associated via the technical artifacts with the process nodes. Those of ordinary skill in the art will readily recognize that the report 220 can include other types of process related information, such as for example the name of the target application that performs the selected action or operation. The report 220 is useful in identifying the data that is affected by each step in the process.

FIGS. 9A and 9B illustrate different types of report 240, which reverses the information in the report 220 of FIG. 8, showing which steps affect a particular data store. For example, the illustrated report 240 includes column 242 that lists a series of data stores, while columns 244, 246 and 248 show the exact process steps or nodes which perform delete, read or write operations to the corresponding data store in column 242. This report may be useful in identifying the process steps which perform operations against a particular data store. For example, if during the execution of the application it is found that records are inadvertently been deleted from a table, an analyst may easily find which process steps might have performed this operation.

Figure 10:
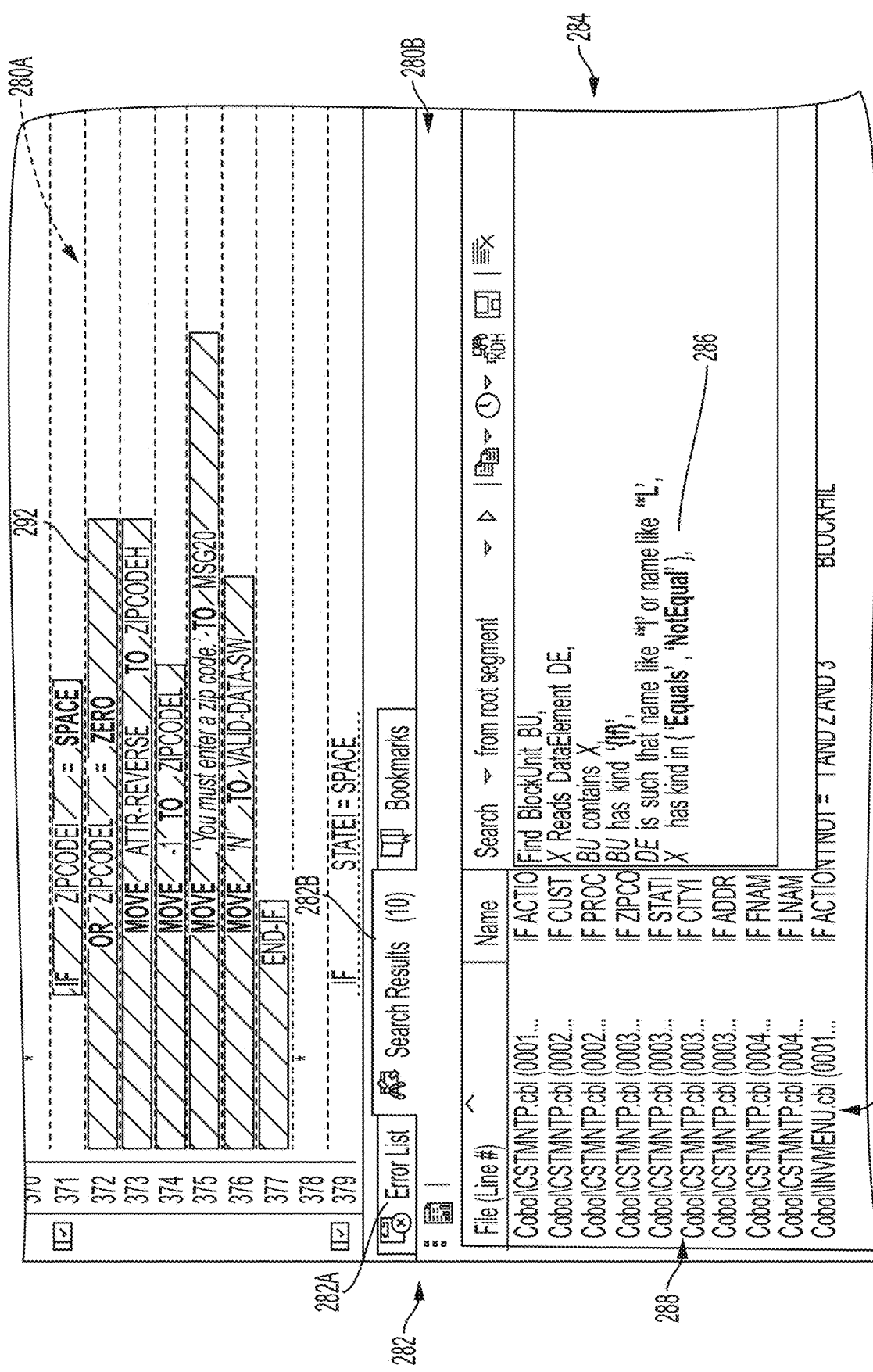
FIG. 10 is a schematic depiction of a window generated by the process flow identification system showing a search box for searching business rules according to the teachings of the present invention.

The present invention is also directed to the ability of the process flow identification system 10 of the present invention to identify rule related data from the extracted data, process the extracted data via the rule identification unit 34 to identify rule data, such as one or more business rules, and then import or associate one or more of the identified business rules with one or more nodes of a process flow diagram. With reference to FIGS. 1 and 10, the process flow identification system 10 further includes a rule identification unit 34 for identifying rule related data, such as business rules, from the extracted data 16 that are present in the applications. The business rule data can be linked, associated with or imported into a process flow diagram, such as for example the process flow diagram 60, FIGS. 4-5, by the process flow diagram unit 26. The business rule data can be linked for example to a process node 62 in a process flow diagram, an example of which is process flow diagram 60, in a manner similar to the methodology employed when linking a process node with a technical artifact. Specifically, the operator can employ the rule discovery unit 34 to identify the business rules from the extracted data 16 that are present in the applications, such as the target application, as well as embodiments of the rules in the form of snippets of code. According to one embodiment, the operator or user can simply employ the user interfaces of the system 10 to add the business rules thereto, and then for each business rule specify the code which embodies the rules. This process, however, can be inefficient and error prone, as the user may forgot to either add business rules or fail to specify all possible embodiments of the rules. According to a more efficient implementation, the operator can start with an operator-defined code pattern and the system can search for the code pattern in the software code of the application. The system 10 can then automatically identify a business rule from the discovered code. The system 10 can create a rule from each code snippet found by the search of the code pattern and mark the code snippet as the embodiment of that business rule.

FIG. 10 is a schematic representation of a set of windows 280A, 280B generated by the system 10 of the present invention. The illustrated window 280B can include a plurality of tab elements 282, including for example an Error List tab element 282A and a Search Results tab element 282B that can display a list of code snippets that are discovered by the system based on selected search parameters. The illustrated window 280B includes a sub-window 284 in which the operator can write a search query 286 in order to find a particular code pattern or snippet of code. The search query 286 can be written in a custom query language which can interrogate the data in the Knowledge Repository 22 of FIG. 1. The development of such a search query language is based on known state of art software code and associated techniques. The result of the search query 286 which conforms to the pattern expressed by the parameters of the query can be code snippets 288 that are arranged or set forth in a list 290 in the window 280B. The entire code 292 associated with one of the code snippets 288 in the list 290 can be displayed in the window 280B. The operator can select one or more of the code snippets 288 in the list 290 and can create one or more business rules therefrom. This implicitly creates a mapping of the business rules to code snippets. As an illustrative example, the operator can write a search query "find all code in which the field ZIP-CODE is tested for an empty string value." The search query then locates or discovers one or more code snippets, such as for example, IF ZIP-CODE=" " THEN MOVE "ZIP CODE MUST BE ENTERED" TO ERROR-MESSAGE. The operator makes a judgement that this represents a validation rule, which may be described as "Cannot complete an order unless the ZIP code of the client is entered." The system 10 retains the association or mapping of the business rule and the code snippet 288.

Figure 11:
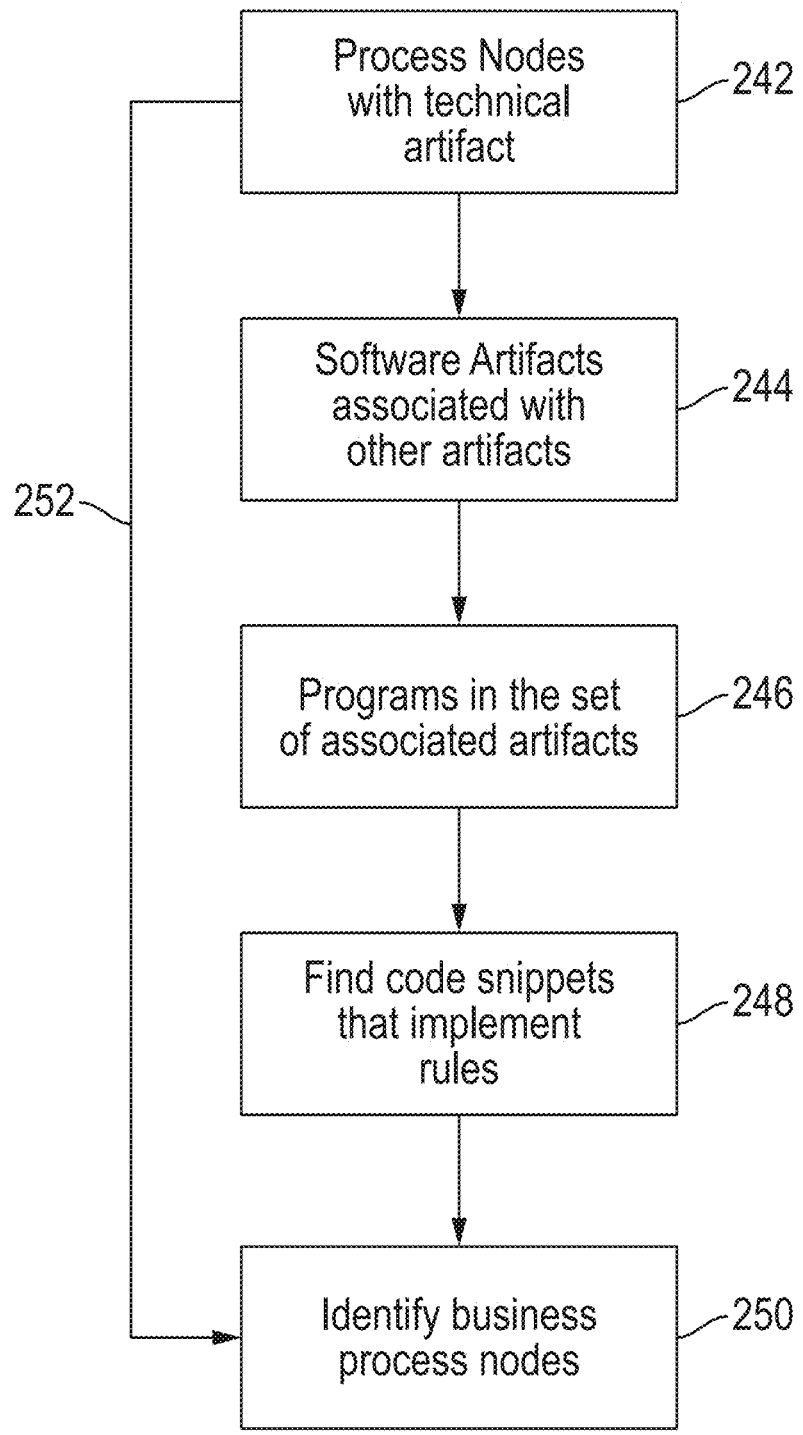
FIG. 11 is a schematic flow chart diagram showing the steps for identifying technical artifacts and business rules and then associating the artifacts and rules with nodes in a process flow diagram according to the teachings of the present invention.

Further, the process flow identification system 10 can automatically establish relationships between the nodes or steps of the business process and the identified business rules, as shown for example in FIG. 11. The system 10 links or associates a technical artifact with one or more nodes 62 in a process flow diagram 60, step 242. The linking between the process nodes and the technical artifact identifies relationships between the nodes or steps and the underlying software applications (e.g., target application). The system 10 then proceeds to determine all relationships between the primary software applications and artifacts with other related software applications and artifacts, step 244. For example, if the process node is related to a selected screen through a linked technical artifact, then all programs which act from the screen appear in an implicit relationship with the same process node. This linkage is displayed in an architecture diagram, such as the type generated by the architecture diagram unit 30.

Further, the system 10 forms all associated technical artifacts, and only the artifacts containing procedural code are retained, step 246. In general, the retained code are programs, scripts, and procedures, as opposed to screens or data stores. In the set of programs thus obtained, the system 10 searches for code snippets 288 which implement the business rules, step 248. As the mapping exists between such code snippets 288 and business rules, an association can be made between the programs and the business rules. As such, the system can identify the business rules associated with each process node, 250.

In the step 252, the associations from steps 242, 244, 246, 248 and 250 are joined to form associations between process nodes and business rules. This fulfills the main objective of the discovery process, which is forming the associations between process nodes or steps and business rules. As an illustrative example, a business process node N may be based on the screen S (known from step 242) which communicates with program P (known from step 244). At step 248, the system finds that program P contains a code snippet 288 which implements a business rule R, as known in step 250. As such, the system can determine that the process node N is associated with business rule R.

Figure 12A:
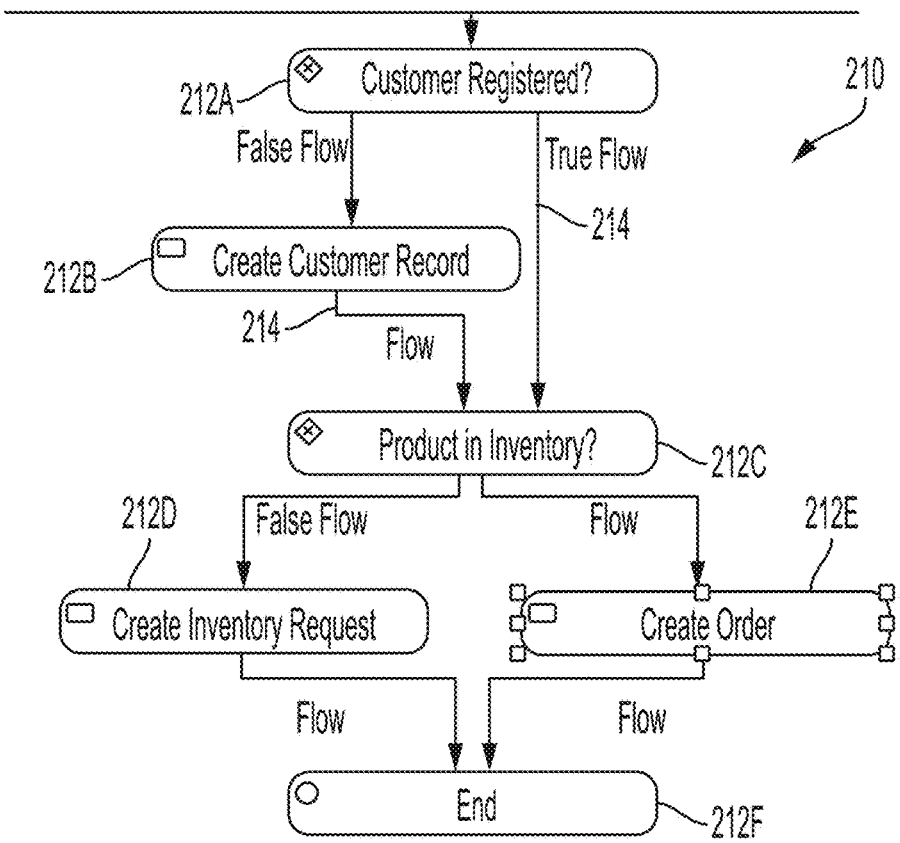
FIG. 12A is a schematic depiction of an example process flow diagram that can be generated by the process flow diagram unit according to the teachings of the present invention.

FIG. 12A illustrates an example process flow diagram 210 that can be generated by the process flow diagram unit 26. As shown, the process flow diagram includes nodes 212A-212F as well as edges or arcs 214 that link the nodes together. The illustrated example process 210 involves the taking of an order for a product from a customer. The process 210 includes initially determining if a customer is registered (node 212A), and requires creating an account (node 212B) if the account does not exist, and then determining whether or not the product is in inventory (node 212C). If the product is in inventory, then the process creates an order (node 212E) and if the product is not in inventory then the process creates an inventory request (node 212D). The business rules can be associated with one or more nodes 212A-212F by the method described above and illustrated in FIG. 11.

Figure 12B:
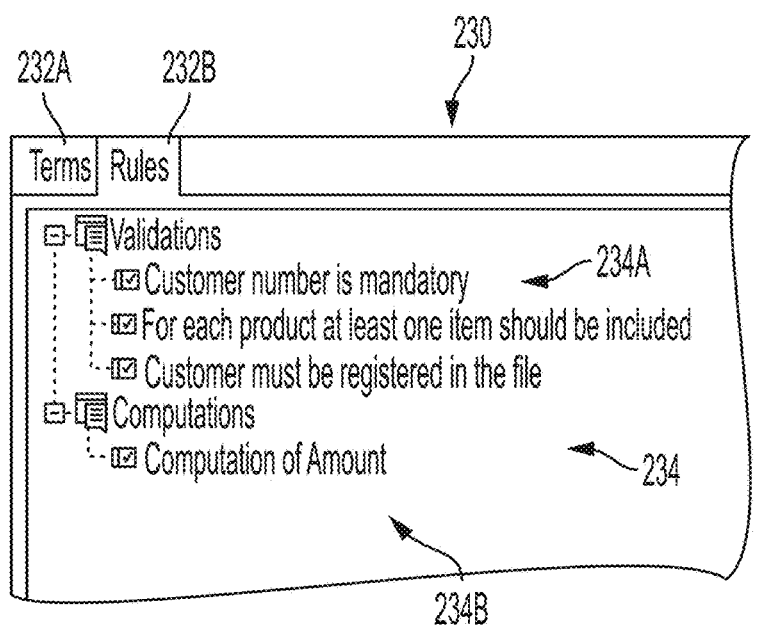
FIG. 12B is a schematic depiction of a window generated by the system of the present invention displaying a list of business rules when one or more of the nodes in FIG. 12A are selected by an operator.

The rule information collected during the identification process can be used to display the newly discovered relationships between business process steps or nodes and business rules in a manner convenient for the operation. By way of example, the user can select (e.g., left-click, right-click or double click) via a user selection mechanism a node representing a step in the process diagram 210 so as to display the business rules associated with the node, as shown for example in FIG. 12B. For example, the operator can select node 212C and in response the system 10, such as via a user interface generator, can generate a window 230 that includes one or more tab elements, such as for example a Terms tab element 232A that sets forth a list of business terms 234 as well as a Rules tab element 232B that can set forth one or more business rules. In the current example, the business rules that are displayed include validation rules 234A and computation rules 234B.

According to another embodiment, the process flow identification system 10 of the present invention can also generate a list of associated business rules that can be displayed in a window or a screen, such as for example the list of business rules 234. The associations between the process nodes or steps and the identified and named business rules can also be displayed to the operator in any selected manner or format, such as a report type format, as shown for example in FIGS. 13A and 13B. For example, FIG. 13A shows a table 300 that includes a Business Rule column 302A for setting forth the identified business rules 304, a Business Process column 302B for setting forth the business process associated with the business rules, and a Step or Node column 302C for identifying the step in the business process that is associated with the business rule and business process. For example, the report 300 shows that the rule "Customer number is mandatory" is exercised by the step "Create Order" of the process "Take Order." FIG. 13B illustrates a report that can be generated by the system and which organizes the information therein in a different manner. For example, the report can include a table 310 that includes a Business Process column 312A, a Step of Node column 312B, and a Business Rules Used column 312C. For example, as illustrated, a Take Order business process can be associated with a Register Customer step or node, and the node can employ or be associated with the business rule Customer name must be entered. As such, FIGS. 13A and 13B shows two different reports, with the same content, but sorted or organized in different ways. Specifically, the table 300 shows business rules in column 302A, and the processes 302B and process nodes 302C in which the business rule appears in a first report, whereas the table 310 shows a list of business processes 312A with the nodes 312B which refer to the list of rules 312C associated therewith in a second report.

Figure 14A:
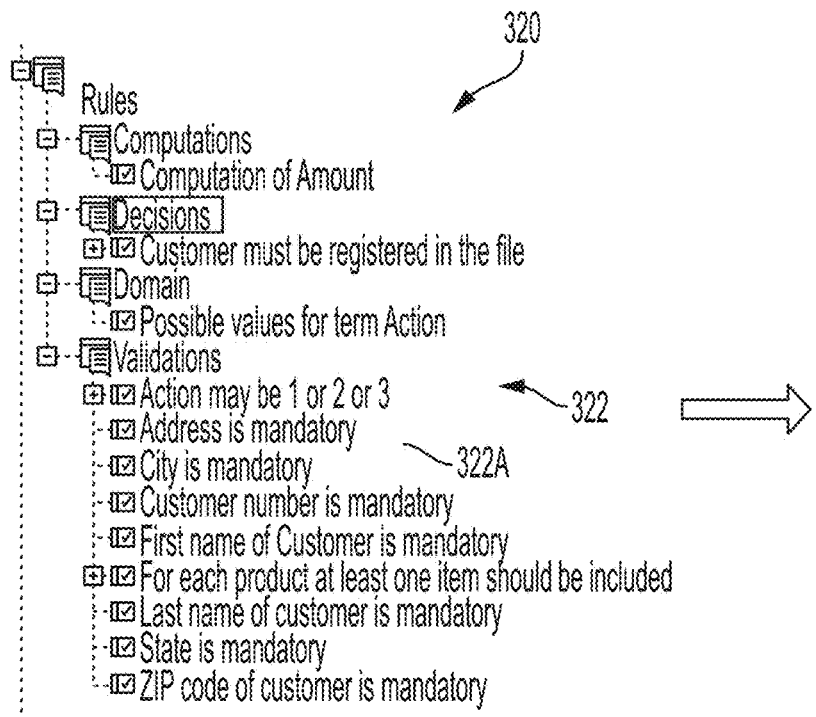
FIG. 14A is a schematic depiction of a window that displays the business rules that are identified by the rule identification unit according to the teachings of the present invention.
Figure 14B:
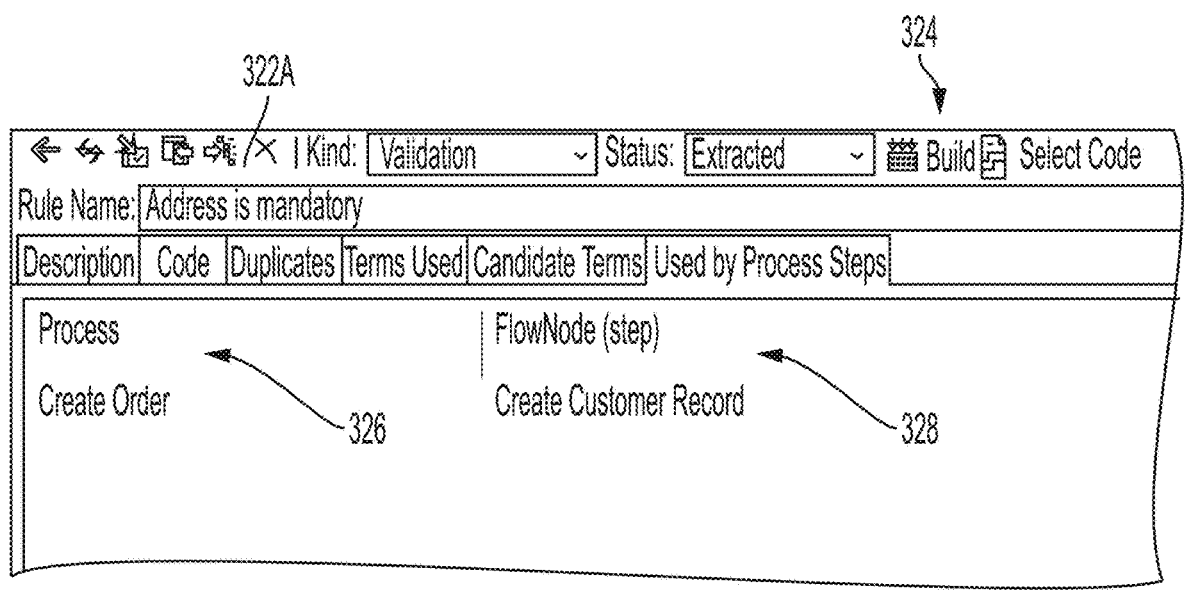
FIG. 14B is a schematic depiction of a table that displays the information associated with one or more of the business rules selected in the list illustrated in FIG. 14A according to the teachings of the present invention.

FIG. 14A also illustrates a window 320 that displays the business rules that are identified by the rule identification unit 34. The rules, such as business rules, are the rules that are present within the applications analyzed by the system 10. The window 320 can display a list of the business rules 322. If the operator wishes to display additional information that is associated with each business rule, then the operator can simply select a business rule in the list 322, such as for example the business rule 322A. Once the business rule 322A is selected, the additional information associated with the rule 322A can be displayed in any selected format, such as in a separate window 324 shown in FIG. 14B. The window 324 shown in FIG. 14B displays the information associated with the selected business rule selected in the list 322. Specifically, the window 324 includes a Business Process column 326 that sets forth the business processes associated with the selected business rule and a Step or Node column 328 that sets forth a node in a process flow diagram that is associated with selected business rule. By way of example, the window 324 shows that the business rule "Address is mandatory" is exercised by the Step "Create Customer Record" of the process "Create Order".

FIGS. 15A-15C illustrate how, after the business rules are identified by the rule identification unit 34, an operator of the system 10 can select a business rule (FIG. 15A), view a list of embodiments of the rule in the software code inside a rule specification window (FIG. 15B) or in a code editor (FIG. 15C). FIG. 15A illustrates a window 320 that displays the business rules that are identified by the rule identification unit 34. The rules can be displayed in any selected manner or format, such as in a list 322. The business rules are the rules that are present within the applications analyzed by the system 10. The operator can select one or more of the business rules in the list 322, and then the system can generate a window 330 that displays embodiments of the selected rule in the associated software code. Alternatively, the system 10 can generate another window 338 that displays the software code associated with the business rule in a code editor.

Figure 16:
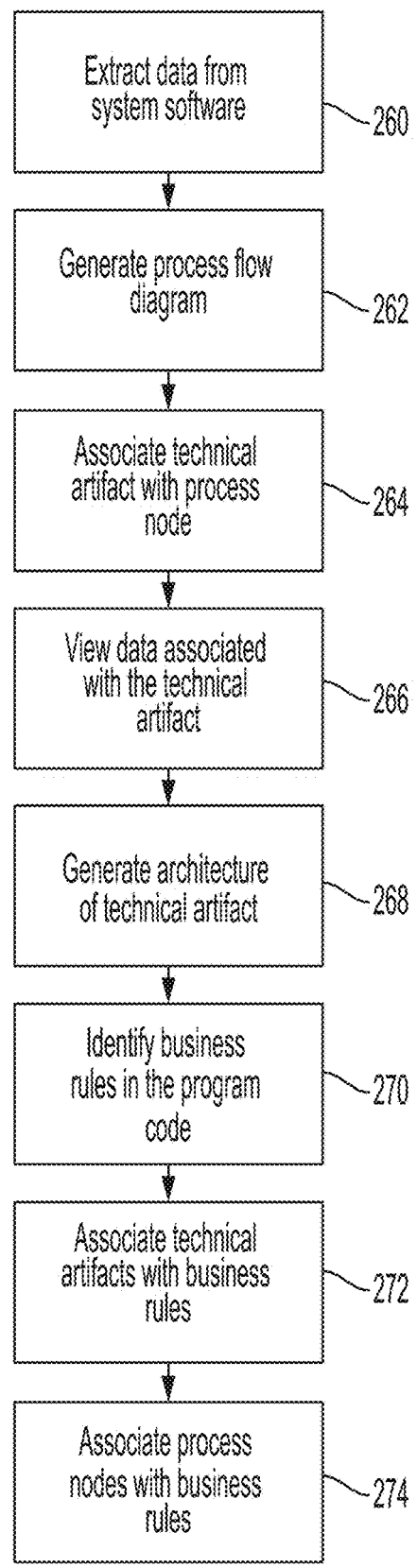
FIG. 16 is a schematic flow chart diagram showing the steps for creating a process flow diagram and associating technical artifacts therewith according to the teachings of the present invention.

In operation, the process flow identification system 10 of the present invention can be employed to generate a process flow diagram and then associate with one or more nodes of the process flow diagram one or more technical artifacts that are associated with one or more target applications. As shown in FIGS. 1 and 16, the process flow identification system 10 includes a data extraction unit 14 for extracting the technical artifacts, and other data, such as term data, from the system software and generating extracted data 16, step 260. Specifically, the data extraction unit 14 can acquire and/or extract the instances where applications, functions, or methods are communicating with other applications, functions, methods in the system 10 or associated systems or applications. For example, the data extraction unit 14 can capture, acquire or extract instances (e.g., technical artifacts) where a program or function or method communicates with another application or function or method, such as business terms. The data acquisition unit 14 also captures the various instances when an application or function or method is accessing a data store, such as a table or record or file, through an operation such as read, write, select, update, insert or delete. The extracted data 16 helps establish the connections between the process flow steps or nodes as seen by the operator. The data extraction unit 14 can be implemented using known reverse engineering tools or applications, such as for example by using known static analysis tools. The extracted data can be stored in the storage unit 18.

The system 10 can then create a process flow diagram 60 that includes information about a selected process by employing the process flow diagram unit 26, step 262. The process flow diagram can be created from a toolbox 160 having a list of node types or can be imported into the system. The process flow diagram can include a plurality of nodes 62 and a plurality of edges or flows 64. The system 10 can also include a project explorer tool 24 that sets forth and lists the technical artifacts extracted by the data extraction unit 14. The project explorer tool 24 can also provide connections between the selected nodes in the process flow diagram. The architecture diagram unit 30 of the system 10 further generates an architecture or outline of the target applications and associated programmatic functions or system calls associated with each of the technical artifacts that are associated with the process flow diagram. The process flow diagram and the technical artifacts can be displayed on the visual application unit, which can include a display device.

The operator using a user selection device 32 can then associate a technical artifact with one or more of the nodes 62 of the process flow diagram 60, step 264. The technical artifact associates one or more technical functions with the process node and/or flows or edges, where the technical functions are associated with one or more target software applications. Hence, the node is associated with the underlying target software that can perform or implement the action associated with the node. The operator 32 can access or view the technical artifact by actuating (e.g., clicking on) or accessing the technical information associated with the node, step 266. The operator can associate a selected technical artifact with each node in the process flow diagram that is performed or implemented by software.

The contents and architecture of the technical artifact can be generated by the architecture diagram unit 26, and can be copied or imported into the process flow diagram by the operator, such as for example by a drag and drop operation, step 268. The architecture of the technical artifact can be displayed, such as for example by the visual application unit 28. The architecture or a selected technical artifact showing the associated target applications and programmatic operations is shown for example in FIGS. 5 and 7.

The flow chart further shows that the rule identification unit 34 can identify one or more business rules associated with the applications, such as one or more software applications, step 270. The system, through any selected methodology, can associate the business rules with one or more of the technical artifacts, step 272. The system can then associate one or more business rules with one or more nodes of a process flow diagram, step 274. Once the business rules are associated with the nodes, the operator can later view the rules associated with the node by selecting the node. As shown for example in FIGS. 13A-14B, the system can also allow the operator to easily view the processes and nodes associated with a selected rule, or conversely to view the rules and processes associated with a selected node.

An advantage of associating a technical artifact with a process node and allowing access thereto by the operator is that if one or more steps of the overall process is changed, then the operator can easily access and view the associated target applications so as to easily and readily determine what if anything needs to be modified.

FIGS. 6-8 illustrate how the steps or nodes in the process flow diagram and the associated or supporting technical artifacts and business rules are linked and shown together. According to one aspect, the operator or end user can request that the architecture of the technical artifact be expanded and displayed. The method to request this can be done in the same way as a one-step expansion is requested. The operator can also select all or contiguous parts of an architecture diagram or tree extracted by the data extraction unit 14 and import one or more of the technical artifacts and/or business terms, such as by a drag and drop mechanism, into the process flow diagram. As a result, the original process flow diagram can also show the full technical implementation of the process step or node, as shown for example in FIGS. 6 and 12A.

In most process flow diagrams having process nodes and edges, the system 10 can associate therewith information or data about the actual programs represented thereby or associated therewith, as well as the relationships between the programs. The process flow diagram usually conforms to a metamodel, either a standard one, like BPMN, or a proprietary one. The present invention does not require a fixed metamodel. In one implementation, the model to which the diagram conforms may be entirely a process model, such as BPMN. In this case, the process nodes can represent software artifacts, such as screens, programs and tables, and can be represented as BPMN process entities. However, if a process node representing, for example, a screen, is presented as a process task, then the system 10 can also track the technical artifact represented thereby. The architecture of the process node can be displayed by actuating 83 the process node, and hence immediately navigating from the node to the representation of the actual screen of the artifact, such that the operator can display the screen, FIG. 3. In the case of a program, the operator can immediately navigate to the actual program code or to a diagrammatic representation of the program control flow. This allows the end user or operator to seamlessly switch between the pure process representation or depiction in the process flow diagram to the representation or depiction of the underlaying target applications associated with the technical artifacts.

According to still another practice, the operator can start with the technical artifacts and then import the artifacts into the process flow diagram, as described above, by viewing and selecting the artifacts in another window or pane, and then copying the artifacts (i.e., by a drag and drop mechanism) into the diagram. The operator can then create process nodes, join them together using process flows or edges, and then create an "ImplementedBy" relationship between the artifacts and the nodes and/or edges to indicate which process nodes are implemented or supported by a selected technical artifact.

It is to be understood that although the invention has been described above in terms of particular embodiments, the foregoing embodiments are provided as illustrative only, and do not limit or define the scope of the invention. Various other embodiments, including but not limited to those described herein are also within the scope of the claims. For example, elements, units, tools and components described herein may be further divided into additional components or joined together to form fewer components for performing the same functions. Further, the above described windows or screens can be generated by any selected portion or unit of the system 10, such as for example, by the visual application unit 28. The system can also employ any selected portion or unit of the system 10 to generate the reports set forth herein, such as for example, by the visual application unit 28.

Any of the functions disclosed herein may be implemented using means for performing those functions. Such means include, but are not limited to, any of the components disclosed herein, such as the electronic or computing device components described herein.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

The term computing device or electronic device can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which could not be solved manually or mentally by humans.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to associate a technical artifact with a node of a process flow diagram. There is no analog to this problem in the non-computer environment, nor is there an analog to the solutions disclosed herein in the non-computer environment. Embodiments can also associate steps or nodes on a business process with business rules, showing an operator which rules are exercised by a step or node in the process, or conversely, which steps or nodes refer to a particular business rule.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed below and shown in FIG. 17 primarily for illustrative purposes and for providing or describing the operating environment of the system of the present invention. The process flow identification system 10 and/or any elements, components, or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the electronic or computing device 400. The present invention can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 400. In one embodiment, the server may be referred to as a remote machine or a node. In another embodiment, a plurality of nodes may be in the path between any two communicating servers or clients. The process flow identification system 10 which includes the data extraction unit 14, the storage unit 18, the rule identification unit 34, the project explorer tool 24, the process flow diagram unit 26, the visual application unit 28, and the architecture diagram unit 30 can be stored on one or more of the clients or servers, and the hardware associated with the client or server, such as the processor or CPU and memory described below.

Figure 17:
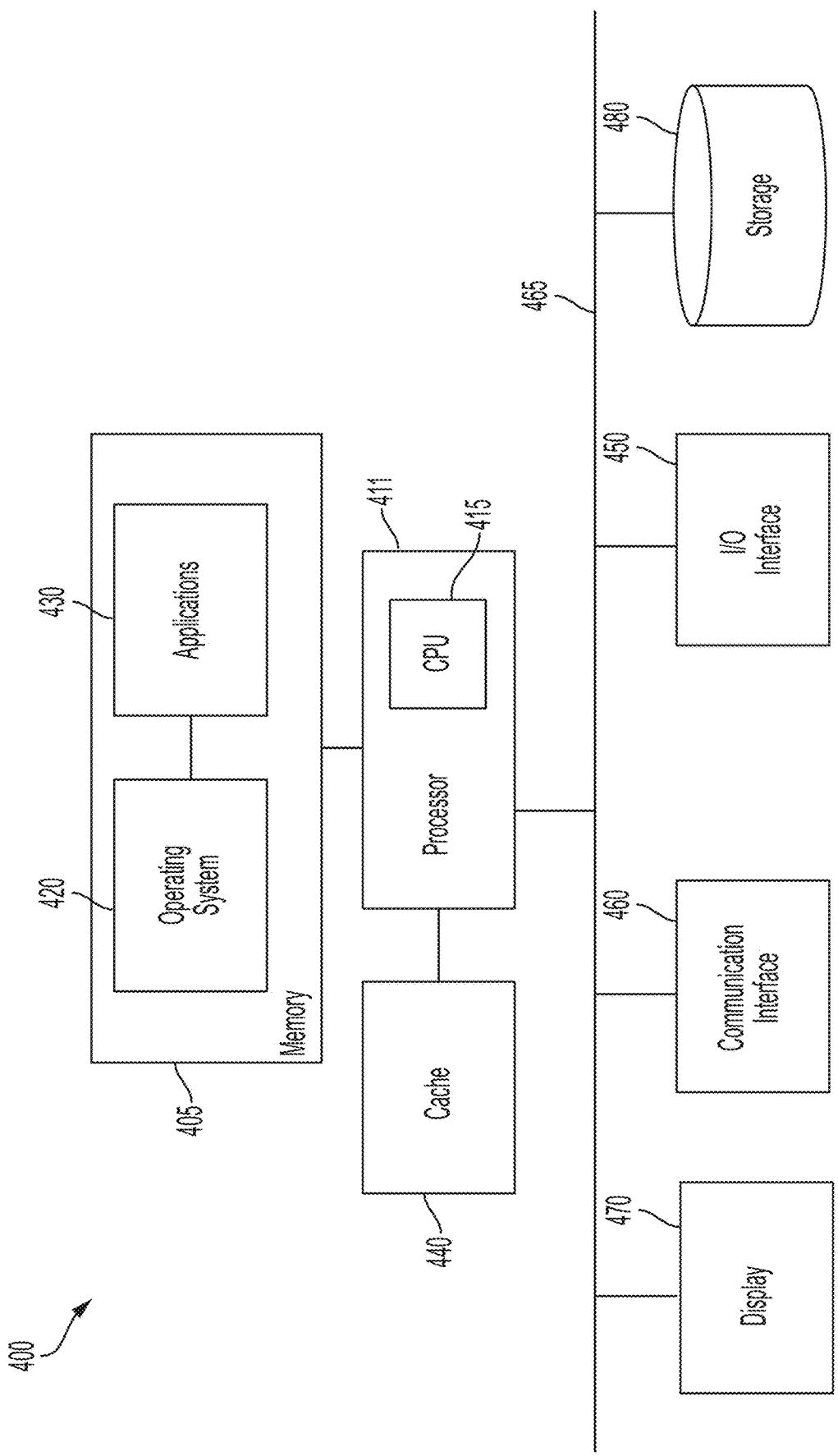
FIG. 17 is a schematic diagram of an electronic device and/or associated system suitable for implementing the process flow identification system of the present invention.

FIG. 17 is a high-level block diagram of an electronic or computing device 400 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 400 can be any suitable electronic circuitry that includes a main memory unit 405 that is connected to a processor 411 having a CPU 415 and a cache unit 440 configured to store copies of the data from the most frequently used main memory 405. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 411 is any logic circuitry that responds to, processes or manipulates instructions received from the main memory unit, and can be any suitable processor for execution of a computer program. For example, the processor 411 can be a general and/or special purpose microprocessor and/or a processor of a digital computer. The CPU 415 can be any suitable processing unit known in the art. For example, the CPU 415 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 411 can be embodied in any suitable manner. For example, the processor 411 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 411 can be configured to execute instructions stored in the memory 405 or otherwise accessible to the processor 411. As such, whether configured by hardware or software methods, or by a combination thereof, the processor 411 can represent an entity (e.g., physically embodied in circuitry) capable of performing operations according to embodiments disclosed herein while configured accordingly. Thus, for example, when the processor 411 is embodied as an ASIC, FPGA or the like, the processor 411 can be specifically configured hardware for conducting the operations described herein. Alternatively, as another example, when the processor 411 is embodied as an executor of software instructions, the instructions can specifically configure the processor 411 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 405.

The electronic device 400 applicable to the hardware of the present invention can be based on any of these processors, or any other processor capable of operating as described herein. The central processing unit 415 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 411 and the CPU 415 can be configured to receive instructions and data from the main memory 405 (e.g., a read-only memory or a random access memory or both) and execute the instructions The instructions and other data can be stored in the main memory 405. The processor 411 and the main memory 405 can be included in or supplemented by special purpose logic circuitry. The main memory unit 405 can include one or more memory chips capable of storing data and allowing any storage location to be directly accessed by the processor 411. The main memory unit 405 may be volatile and faster than other memory in the electronic device, or can dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 405 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 405 can be based on any of the above described memory chips, or any other available memory chips capable of operating as described herein. In the embodiment shown in FIG. 17, the processor 411 communicates with main memory 405 via a system bus 465. The computer executable instructions of the present invention may be provided using any computer-readable media that is accessible by the computing or electronic device 400. Computer-readable media may include, for example, the computer memory or storage unit 405. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 405 is shown within the computing device 400 it will be appreciated that the storage may be distributed or located remotely and accessed via a network or other communication link.

The main memory 405 can comprise an operating system 420 that is configured to implement various operating system functions. For example, the operating system 420 can be responsible for controlling access to various devices, memory management, and/or implementing various functions of the asset management system disclosed herein. Generally, the operating system 420 can be any suitable system software that can manage computer hardware and software resources and provide common services for computer programs.

The main memory 405 can also hold application software 430. For example, the main memory 405 and application software 430 can include various computer executable instructions, application software, and data structures, such as computer executable instructions and data structures that implement various aspects of the embodiments described herein. For example, the main memory 405 and application software 430 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 411 can further be coupled to a database or data storage 480. The data storage 480 can be configured to store information and data relating to various functions and operations of the content characterization systems disclosed herein. For example, as detailed above, the data storage 480 can store information including but not limited to captured information, multimedia, processed information, and characterized content.

A wide variety of I/O devices may be present in or connected to the electronic device 400. For example, the electronic device can include a display 470, and as previously described, the visual application unit 28 or one or more other elements of the system 10 can include the display. The display 470 can be configured to display information and instructions received from the processor 411. Further, the display 470 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays, or electronic papers (e-ink) displays. Furthermore, the display 470 can be a smart and/or touch sensitive display that can receive instructions from a user and forwarded the received information to the processor 411. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 400 can also include an Input/Output (I/O) interface 450 that is configured to connect the processor 411 to various interfaces via an input/output (I/O) device interface 480. The device 400 can also include a communications interface 460 that is responsible for providing the circuitry 400 with a connection to a communications network (e.g., communications network 120). Transmission and reception of data and instructions can occur over the communications network.

I claim:

1. A computer implemented method performed by at least one computer processor for associating a plurality of business rules with one or more portions of a process flow diagram, the method comprising executing a computer program having instructions that when executed by a computer processor for:
    providing extracted data from a plurality of software applications associated with a computing system to form extracted data,
    searching the extracted data for one or more patterns in software code in the form of code snippets associated with the plurality of software applications,
    forming the plurality of business rules from the code snippets,
    providing a process flow diagram having a plurality of nodes and a plurality of edges,
    associating one or more of the plurality of business rules with one or more of the plurality of nodes of the process flow diagram, and
    displaying the process flow diagram,
    wherein the step of providing a process flow diagram includes creating the process flow diagram or importing the process flow diagram.

2. The method of claim 1, further comprising forming a mapping between each of the business rules and the code snippets.

3. The method of claim 1, wherein the step of associating one or more of the plurality of business rules further comprises automatically establishing a relationship between the one or more of the plurality of nodes and the one or more business rules.

4. The method of claim 3, further comprising forming an association between the one or more business rules and the software applications via the code snippets.

5. The method of claim 1, further comprising generating a window having a plurality of tab elements, wherein a first one of the plurality of tab elements displays a list of business terms and a second one of the tab elements displays a list of the business rules.

6. The method of claim 1, further comprising generating a table that includes a plurality of columns including a business rules column for setting forth the plurality of business rules, a business process column for setting forth a business process associated with each of the business rules, and a node column for identifying the node in the business process that is associated with each of the business rules and the business processes.

7. The method of claim 1, further comprising
    generating a first window that displays a list of the plurality of business rules that are present within one or more of the plurality of software applications,
    selecting a first one of the plurality of business rules in the list, and
    generating a second window for displaying additional information associated with the first one of the plurality of business rules.

8. The method of claim 7, wherein the second window displays a first column that sets forth one or more of the business processes associated with the first one of the plurality of business rules and a second column that sets forth one or more of the nodes of the plurality of nodes that are associated with the first one of the business rules.

9. The method of claim 1, further comprising
    extracting a plurality of technical artifacts from the extracted data associated with the plurality of software applications, and
    associating one or more of the plurality of technical artifacts with one or more of the plurality of nodes of the process flow diagram.

10. The method of claim 9, further comprising when the node is actuated, displaying the associated technical artifact.

11. The method of claim 9, wherein each of the plurality of technical artifacts comprises one or more of a software object, a batch job, a screen, a window, one or more panes of the window, a page, a web service, a script, a table, or a file.

12. The method of claim 9, wherein the step of associating further comprises selecting, by an operator, one or more of the plurality of business rules and then associating the selected business rules with one or more of the plurality of nodes.

13. The method of claim 12, further comprising
actuating the one or more of the nodes and selecting the associated business rule, and
when the node is selected, displaying the business rule associated with the node.

14. The method of claim 9, further comprising
actuating the node and selecting the associated technical artifact, and
displaying an architecture of the technical artifact.

15. The method of claim 14, further comprising displaying the relationship between the software applications and the other software applications by an architecture diagram.

16. The method of claim 1, further comprising
displaying the one or more business rules in a list, and
when one of the business rules is selected, generating a window that displays information associated with the one selected business rule, wherein the information includes one or more business processes.

17. The method of claim 1, further comprising
providing a search box for entry of one or more searchable business rules, and
displaying a search result listing a plurality of fields that include the searchable business rules.

18. A system for associating a plurality of business rules with a process flow diagram, comprising
a data extraction unit for extracting data from a plurality of software applications, wherein the plurality of software applications includes one or more target software applications,
a rule identification unit for searching the extracted data for one or more patterns in software code in the form of code snippets associated with the plurality of software applications, and
for identifying the plurality of business rules from the code snippets,
a process flow diagram unit for providing a process flow diagram having a plurality of nodes and a plurality of edges and for associating one or more of the plurality of business rules with one or more of the plurality of nodes, and
a visual application unit for displaying the process flow diagram generated by the process flow diagram unit and for displaying the plurality of business rules from the rule identification unit,
wherein the process flow diagram includes is created by the process flow diagram unit or is imported to the process flow diagram unit.

19. The system of claim 18, wherein the data extraction unit extracts one or more technical artifacts from the plurality of software applications, the system further comprising
a project explorer tool for receiving the technical artifacts and for forming a list of the technical artifacts,
an architecture diagram unit for generating an architecture of each of the plurality of technical artifacts, and
a visual application unit for displaying the process flow diagram generated by the process flow diagram unit and for displaying the technical artifacts from the project explorer tool.

20. The system of claim 19, wherein the data extraction unit extracts instances where at least one of the plurality of software applications accesses at least another one of the plurality of software applications, wherein the instances form the technical artifacts.

21. The system of claim 18, wherein the data extraction unit extracts instances when at least one of the plurality of software applications accesses a data store through a programmatic operation.

22. The system of claim 18, wherein an operator selects at least one of the technical artifacts and at least one of the plurality of business rules and associates the selected technical artifact and the business rule with at least one of the plurality of nodes.

23. The system of claim 19, wherein the project explorer tool further comprises means to associate one or more of the plurality of nodes with one or more of the technical artifacts.

24. The system of claim 19, wherein the architecture of each of the technical artifacts generated by the architecture diagram unit includes programmatic relationships between the node representing the artifact and one or more of the nodes representing other technical artifacts.

25. The system of claim 18, further comprising one or more computer processors programmed to:
display the plurality of nodes and edges and representing flows therebetween,
display the plurality of nodes representing the technical artifacts and edges representing relationships therebetween,
create the process flow diagram by selecting one or more of the plurality of node types and flow types and instantiating them in the process flow diagram,
select one of the plurality of technical artifacts and associate the selected technical artifact with one of the plurality of nodes,
select one of the business rules and associate the selected business rule with the one of the plurality of nodes, and
generating an implementation relationship between the technical artifact and the process node, such that the technical artifact executes the process node.

26. A non-transitory, computer readable medium comprising computer program instructions tangibly stored on the computer readable medium, wherein the computer program instructions are executable by at least one computer processor to perform a method, the method comprising:
extracting a plurality of business rules from a computing system having a plurality of software applications,
wherein the plurality of software applications includes one or more target applications, the business rules being identified from code snippets in the plurality of software applications,
providing a process flow diagram having a plurality of nodes and a plurality of edges,
associating one or more of the plurality of business rules with one or more of the plurality of nodes of the process flow diagram,
displaying the process flow diagram, and
when the node is actuated, displaying the associated business rule,
wherein providing a process flow diagram includes creating the process flow diagram or importing the process flow diagram.

27. The computer readable medium of claim 26, further comprising
extracting a plurality of technical artifacts from the plurality of software applications, and
associating one or more of the plurality of technical artifacts with one or more of the plurality of nodes of the process flow diagram.

28. The computer readable medium of claim 26, further comprising selecting, by an operator, one or more of the business rules and then associating the selected business rule with the one or more nodes.

29. The computer readable medium of claim 26, further comprising
   actuating the node and selecting the associated business rule, and
   when the node is selected, displaying the business rule associated with the node.

30. The computer readable medium of claim 29, further comprising
   actuating the node and selecting the associated technical artifact, and
   displaying an architecture of the technical artifact.

31. The computer readable medium of claim 26, wherein the technical artifacts includes data fields, further comprising
   determining the business rule associated with the data field, and
   automatically deriving the relationship between the nodes and the business rules based on the association between the business rules and the data field.

32. The computer readable medium of claim 26, further comprising
   displaying the plurality of business rules in a list, and
   when one of the plurality of business rules is selected, generating a window that displays information associated with the one selected business rules, wherein the information includes one or more business processes.

* * * * *